US011761105B2

(12) United States Patent
Huang et al.

(10) Patent No.: US 11,761,105 B2
(45) Date of Patent: Sep. 19, 2023

(54) METHODS AND APPARATUS FOR PRODUCING HYDROGEN PEROXIDE

(71) Applicant: THE UNIVERSITY OF BRITISH COLUMBIA, Vancouver (CA)

(72) Inventors: Aoxue Huang, Vancouver (CA); Roxanna Delima, Richmond Hill (CA); Ryan Jansonius, Calgary (CA); Curtis Berlinguette, Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 18/164,201

(22) Filed: Feb. 3, 2023

(65) Prior Publication Data

US 2023/0183873 A1 Jun. 15, 2023

Related U.S. Application Data

(63) Continuation of application No. PCT/CA2022/050553, filed on Apr. 8, 2022.
(Continued)

(51) Int. Cl.
*C25B 15/08* (2006.01)
*C25B 1/04* (2021.01)
(Continued)

(52) U.S. Cl.
CPC .......... *C25B 15/081* (2021.01); *B01D 53/229* (2013.01); *B01D 71/02231* (2022.08);
(Continued)

(58) Field of Classification Search
CPC ... C25B 15/081; C25B 11/081; C25B 11/052; C25B 1/04; B01D 71/02231; B01D 53/229; C01B 15/0295
(Continued)

(56) References Cited

U.S. PATENT DOCUMENTS 6,346,228 B1  2/2002 Choudhary et al.
6,432,376 B1  8/2002 Choudhary et al.
(Continued)

FOREIGN PATENT DOCUMENTS

IN  2005DE03276 A  10/2007
IN     218339 B      5/2008
(Continued)

OTHER PUBLICATIONS

Belykh, L.B. et al., "Role of phosphorus in the formation of selective palladium catalysts for hydrogenation of alkylanthraquinones", Applied Catalysis A, General 589 (2020) 117293.
(Continued)

*Primary Examiner* — Anita Nassiri-Motlagh
(74) *Attorney, Agent, or Firm* — Oyen Wiggs Green & Mutala LLP

(57) ABSTRACT

Apparatuses and methods for producing hydrogen peroxide by performing coupled chemical and electrochemical reactions are disclosed. An electrochemical cell has a chemical reaction chamber configured to hydrogenate a shuttle molecule and an electrochemical chamber configured to electrochemically dissociate water to form hydrogen ions at an anode, and to reduce the hydrogen ions to atomic hydrogen at a cathode. The chemical reaction chamber and the anode chamber are separated by a metallic membrane. The metallic membrane acts as a cathode of the cell, a hydrogen-selective layer and a catalyst. The metallic membrane may comprise a layer of palladium or a palladium alloy. A layer of co-catalyst may optionally be electrodeposited on the layer of palladium or palladium alloy. An ion exchange membrane separates the metallic membrane and the anode chamber. The hydrogenated shuttle molecule may be supplied to a reactor for contacting an oxygen-containing gas to yield hydrogen peroxide.

20 Claims, 10 Drawing Sheets

Related U.S. Application Data

(60) Provisional application No. 63/173,138, filed on Apr. 9, 2021, provisional application No. 63/173,745, filed on Apr. 12, 2021.

(51) Int. Cl.
  *B01D 53/22* (2006.01)
  *C01B 15/029* (2006.01)
  *C25B 11/081* (2021.01)
  *C25B 11/052* (2021.01)
  *B01D 71/02* (2006.01)

(52) U.S. Cl.
  CPC ............ *C01B 15/0295* (2013.01); *C25B 1/04* (2013.01); *C25B 11/052* (2021.01); *C25B 11/081* (2021.01)

(58) Field of Classification Search
  USPC ........................................................ 423/584
  See application file for complete search history.

(56) References Cited

U.S. PATENT DOCUMENTS

| 6,448,199 B1 | 9/2002 | Choudhary et al. |
| 9,926,634 B2 | 3/2018 | Bisselink et al. |

FOREIGN PATENT DOCUMENTS

| IN | 242273 B | 8/2010 |
| KR | 101763609 B1 | 8/2017 |
| WO | 2019144239 A1 | 8/2019 |
| WO | 2021212236 A1 | 10/2021 |

OTHER PUBLICATIONS

Chinta, S. et al., "A Mechanistic Study of H2O2 and H2O Formation from H2 and O2 Catalyzed by Palladium in an Aqueous Medium", J. Catal. 2004, 225 (1), 249-255.
Delima, R. S. et al., "Supported palladium membrane reactor architecture for electrocatalytic hydrogenation", J Mat Chem A: Mat Energy Sustain 2019 (7) 26586.
Edwards, J. K. et a;., "Palladium and Gold-Palladium Catalysts for the Direct Synthesis of Hydrogen Peroxide", Angew. Chem. Int. Ed Engl. 2008, 47 (48), 9192-9198.
Edwards, J. K. et al., "Switching Off Hydrogen Peroxide Hydrogenation in the Direct Synthesis Process", Science. 2009, 323(5917), 1037-1041.
Huang, A. et al., "Electrolysis Can Be Used to Resolve Hydrogenation Pathways at Palladium Surfaces in a Membrane Reactor", JACS Au 2021, 1(3), 336-343.
Jansonius, R. P. et al., "Hydrogenation without H2 Using a Palladium Membrane Flow Cell", Cell Reports Physical Science 2020, 1 (7), 100105.
Kurimoto, A. et al., "Physical Separation of H2 Activation from Hydrogenation Chemistry Reveals the Specific Role of Secondary Metal Catalysts", Angew. Chem. Int. Ed Engl. 2021, 60 (21), 11937-11942.
Murray, A. T. et al., "Electrosynthesis of Hydrogen Peroxide by Phase-Transfer Catalysis", Joule. 2019, 3(12), 2942-2954.
Querci, C, et al., "Quinone-mediated synthesis of hydrogen peroxide from carbon monoxide, water and oxygen", Journal of Molecular Catalysis A: Chemical 176 (2001) 95-100.
Sherbo, R. S. et al., "Efficient Electrocatalytic Hydrogenation with a Palladium Membrane Reactor", J Am Chem Soc 2019, 141, 7815-7821.
Sherbo, R. S. et al., "Complete electron economy by pairing electrolysis with hydrogenation", Nature Catalysis 2018 (1) 502.
Xia, C. et al., "Direct electrosynthesis of pure aqueous H2O2 solutions up to 20% by weight using a solid electrolyte", Science 366, 226-231 (2019).

METHODS AND APPARATUS FOR PRODUCING HYDROGEN PEROXIDE

CROSS-REFERENCE TO RELATED APPLICATIONS

This application is a continuation of PCT international application No. PCT/CA2022/050553 filed 8 Apr. 2022 and entitled METHODS AND APPARATUS FOR PRODUCING HYDROGEN PEROXIDE. PCT international application No. PCT/CA2022/050553 claims priority from U.S. application No. 63/173,138 filed 9 Apr. 2021 and U.S. application No. 63/173,745 filed 12 Apr. 2021. For purposes of the United States, this application claims the benefit under 35 U.S.C. § 119 of U.S. application No. 63/173,138 filed 9 Apr. 2021 and entitled HYDROGEN PEROXIDE PRODUCTION USING A MEMBRANE REACTOR, and U.S. application No. 63/173,745 filed 12 Apr. 2021 and entitled HYDROGEN PEROXIDE PRODUCTION USING A MEMBRANE REACTOR which are hereby incorporated herein by reference for all purposes.

FIELD

This invention relates generally to apparatuses and methods for producing hydrogen peroxide. Specific embodiments provide electrochemical cells and methods which apply such cells for the synthesis of hydrogen peroxide.

BACKGROUND

The synthesis of hydrogen peroxide generally involves the use of large quantities of hydrogen gas. Hydrogen gas is a very flammable gas. It is typically derived from a carbon- and energy-intensive process known as steam-methane reforming. Steam-methane reforming involves an endothermic reaction that requires high temperature conditions to produce CO and $H_2$ (1:3 molar ratio). A subsequent exothermic reaction converts CO into $H_2$ and $CO_2$ (1:1 molar ratio) in a water-gas shift reactor in the presence of water. Steam-methane reforming produces an equivalent of 0.25 $CO_2$ for every $H_2O_2$ molecule (i.e., 2.8 $Mt_{CO2}$ $y^{-1}$) and requires ~8.6 GW $y^{-1}$. Creating hydrogen gas is therefore very expensive, dangerous, requires a lot of energy, and is harmful to the environment.

The inventors have recognised a general need for improved apparatuses and methods for the synthesis of hydrogen peroxide. There is a particular need for such methods and apparatuses which do not require a supply of hydrogen gas.

SUMMARY

This application has a number of aspects. These include, without limitation:
- methods and apparatuses for producing hydrogen peroxide without hydrogen gas;
- methods and apparatuses for hydrogenating a shuttle molecule without hydrogen gas which involves pairing an electrochemical reaction that generates hydrogen ions from water and a chemical reaction in which atomic hydrogen reacts with the shuttle molecule to yield a hydrogenated shuttle molecule;
- methods of efficient conversion of shuttle molecules to hydrogenated shuttle molecules;
- methods and apparatuses for synthesizing hydrogen peroxide using the hydrogenated shuttle molecule; and
- methods and apparatuses for direct synthesis of hydrogen peroxide which involves pairing an electrochemical reaction that generates hydrogen ions from water and a chemical reaction in which atomic hydrogen reacts with a gaseous oxygen to yield hydrogen peroxide.

One aspect of the invention provides a method for producing hydrogen peroxide by performing coupled chemical and electrochemical reactions. The method comprises electrochemically dissociating, at an anode, a hydrogen-containing compound to form one or more hydrogen ions ($H^+$). The hydrogen ions may be transported through an ion exchange membrane to a metallic membrane. Upon reaching the metallic membrane, the hydrogen ions are reduced to form hydrogen atoms. The hydrogen atoms are diffused through the metallic membrane into a chemical reaction chamber. The diffused hydrogen atoms react with a shuttle molecule in the chemical reaction chamber to form a hydrogenated shuttle molecule. In some embodiments, the reaction between the diffused hydrogen atoms and shuttle molecule occurs on a surface of the metallic membrane. The hydrogenated shuttle molecule is removed from the chemical reaction chamber and is arranged to react with a gas to form a product comprising hydrogen peroxide.

In some embodiments, the shuttle molecule is a quinone compound or a quinone derivative.

In some embodiments, the hydrogen-containing compound is water. The electrochemical dissociation of water forms oxygen and hydrogen ions. In some embodiments, the electrochemical dissociation of the hydrogen-containing compound (e.g., water) at the anode is performed in an aqueous electrolyte solution.

In some embodiments, reacting the hydrogen atoms with the shuttle molecule is performed in a solvent. The solvent may for example be an organic solvent or a mixture of organic solvents. In some embodiments, the method involves flowing a constant supply of shuttle molecules or shuttle molecules contained in the solvent into the chemical reaction chamber.

In some embodiments, the solvent containing the shuttle molecules in the chemical reaction chamber is a different solution than that selected as the electrolyte(s) contained in the electrochemical reaction zones.

The metallic membrane comprises a dense metallic hydrogen selective layer. The hydrogen selective layer may for example comprise a layer of palladium or a palladium alloy. In some embodiments, a layer of co-catalyst is deposited on the hydrogen selective layer. The layer of co-catalyst may be deposited by electrodeposition or shutter-deposition. In some embodiments, the co-catalyst comprises one or more transition metals. In example embodiments, the co-catalyst comprises one or both of palladium or gold.

In some embodiments, the method comprises maintaining a current density at the metallic membrane of at least 100 $mA/cm^2$.

In some embodiments, the method comprises maintaining a temperature in the range of from 25° C. to 80° C.

In some embodiments, a concentration of the shuttle molecule in the solvent being fed into the chemical reaction chamber is in the range of from 0.1 M to 1 M, and in some embodiments, in the range of from 0.1 M to 0.4 M.

In example embodiments, the gas that is being reacted with the hydrogenated shuffle molecule comprises an oxygen-containing gas. The oxygen-containing gas may comprise a gaseous oxygen or a mixture comprising the gaseous oxygen and a second gas. In some embodiments, the second gas comprises one or more inert gases. An example is nitrogen gas ($N_2$).

In some embodiments, the ratio of unreacted shuttle molecule to hydrogenated shuttle molecule being fed to the reactor to contact the oxygen-containing gas is less than 3:2 including 1:2, 2:3, 1:4, 1:9, etc. In some embodiments, the ratio of unreacted shuttle molecule to hydrogenated shuttle molecule being fed to the reactor to contact the oxygen-containing gas is at least 1:10, or in some embodiments, at least 1:20.

In some embodiments, reacting the oxygen-containing gas with the hydrogenated shuffle molecule at the chemical reaction chamber forms the product comprising hydrogen peroxide and regenerated shuttle molecules. Downstream processes may be provided to recover the hydrogen peroxide.

In some embodiments, the hydrogen peroxide is separated from the product. An example separation method comprises adding water to the product to extract an aqueous hydrogen peroxide solution from impurities contained in the product. In some embodiments, the impurities include the regenerated shuttle molecules. In some embodiments, the regenerated shuttle molecules are returned to the chemical reaction chamber.

In some embodiments, the aqueous hydrogen peroxide solution is concentrated and/or stabilized with a stabilizing agent before storage.

Another aspect of the invention provides a method for producing hydrogen peroxide directly by performing coupled chemical and electrochemical reactions. The method comprises electrochemically dissociating, at the anode, water to form oxygen and one or more hydrogen ions. The hydrogen ions may be transported through an ion exchange membrane to the metallic membrane. The hydrogen ions may be reduced at the metallic membrane to form hydrogen atoms. The hydrogen atoms are diffused through the metallic membrane into a chemical reaction chamber. A constant supply of a mixture comprising gaseous oxygen and a solvent is provided to the chemical reaction chamber. The hydrogen atoms react with the gaseous oxygen at the chemical reaction chamber to form hydrogen peroxide. In some embodiments, the reaction between the hydrogen atoms and the gaseous oxygen occurs on a surface of the metallic membrane.

In some embodiments, the solvent comprises an organic solvent, an aqueous solvent, or a mixture comprising an organic solvent and an aqueous solvent. In example embodiments, the solvent comprises an alcohol such as methanol. In other example embodiments, the solvent comprises a mixture comprising water and alcohol.

In some embodiments, the method further comprises selectively increasing a pressure within the chemical reaction chamber. The selective increasing of pressure within the chemical reaction chamber may result in maintaining a pressure of the gaseous oxygen within the chemical reaction chamber in a range of from 5 psi to 30 psi.

In some embodiments, the hydrogen peroxide formed at the chemical reaction chamber is used to mediate an oxidation reaction of a carbon-containing compound to form one or more useful products.

An aspect of the invention relates to a system for producing hydrogen peroxide. The system comprises an electrolyzer and a reactor. The reactor may be arranged downstream of the electrolyzer. The electrolyzer comprises a chemical reaction chamber, an anode chamber, a cathode and a metallic membrane. An anode is exposed in the anode chamber and is adapted to oxidize a hydrogen-containing compound to form hydrogen ions. The metallic membrane has a hydrogen selective layer between the chemical reaction chamber and the cathode chamber. The metallic membrane is adapted to electrochemically reduce a hydrogen ion to a hydrogen atom at the cathode chamber and to allow the hydrogen atom to diffuse through the membrane to react with a shuttle molecule in the chemical reaction chamber to yield a hydrogenated shuttle molecule. A fluid inlet and/or a fluid outlet may be provided at the chemical reaction chamber. The fluid inlet may be fluidly connected to a reservoir containing a mixture comprising a solvent and the shuttle molecule arranged to supply a flow of the mixture to the chemical reaction chamber. The fluid outlet may be fluidly connected to an inlet of a reactor for flowing the hydrogenated shuffle molecule to the reactor. An ion exchange membrane may be arranged to separate the cathode chamber and the anode chamber. The reactor may be configured to bring a gas into contact with the hydrogenated shuttle molecule to yield a product comprising hydrogen peroxide. In some embodiments, the gas comprises an oxygen-containing gas.

In some embodiments, the metallic membrane is arranged to contact the ion exchange membrane.

In some embodiments, the system further comprises a separator arranged downstream of the reactor for separating hydrogen peroxide from the product, a purifier arranged downstream of the separator for purifying the separated hydrogen peroxide and a concentrator arranged downstream of the purifier for concentrating the purified hydrogen peroxide.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Definitions

"Selectivity" refers to the product selectivity of a reaction. Selectivity is measured by the ratio of the desired product formed to the undesired product(s) formed. For example, if a particular reaction yields 4 moles of a desired product and 3 moles of undesired products then the reaction has a selectivity of 4/3. Higher selectivity is generally better.

"Hydrogen" is any isotope of the element with atomic number 1.

"Hydrogen ion" is ionized hydrogen ($H^+$). A proton is an example of a hydrogen ion.

"Hydrogenation" includes any reaction between hydrogen atoms or hydrogen molecules ($H_2$) and a reactant. Hydrogenation includes reactions which result in a hydrogen atom being added to a reactant to form a product of the reaction. For example, a hydrogenation reaction may reduce a double or triple bond in a hydrocarbon. One example of a hydrogenation reaction is adding hydrogen atoms to a shuttle molecule such as a suitable quinone compound to yield a hydrogenated shuttle molecule. Another example of a hydrogenation reaction is a reaction which adds hydrogen atoms to oxygen molecules to yield hydrogen peroxide.

"Palladium" is used herein broadly and comprises various composition of matter, including alloys and other combinations of palladium metal with other materials. For example, a "palladium membrane" may be formed by electrodepositing one or more layers of palladium onto a substrate (which may be a palladium foil, or a porous polymer). In one example, the substrate may be a rolled Pd wafer bar. Without being bound to any particular theory, the electrodeposited palladium may provide increased surface area that may increase the rate of reaction. Any suitable method for depositing palladium on a substrate, membrane foil, or other dense deuterium selective material may be used.

Figure 4:
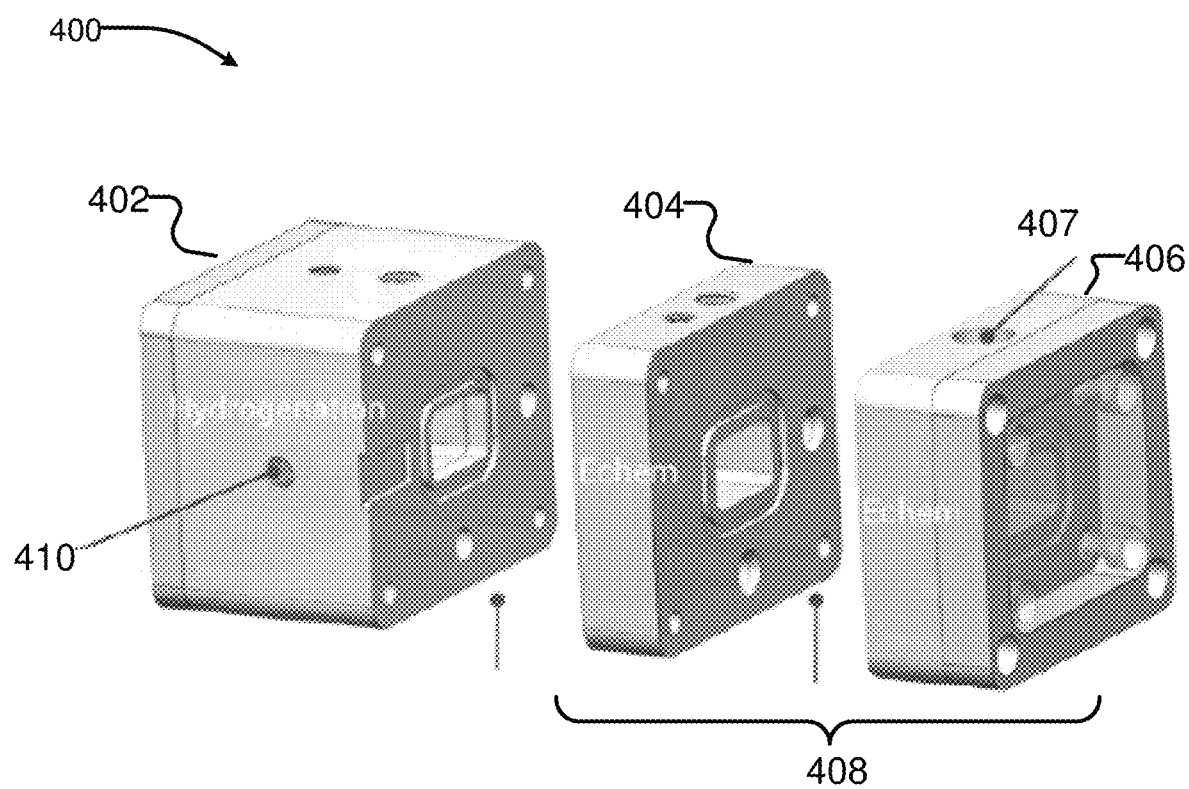
FIG. 4 is a schematic diagram showing a reactor according to an example embodiment of the invention.

"H-cell" is used herein broadly and comprises a two-reaction zone reactor architecture. For illustration purposes only, and not to limit the scope of the invention, an exemplary illustration of a design of an H-cell is shown in FIG. 4.

"ePMR" refers to an "electrocatalytic palladium membrane reactor" that includes an electrochemical reaction zone and hydrogenation reaction zone separated by a palladium membrane further comprising a transition metal catalyst.

"ePMR flow cell" is used herein as an abbreviation for "electrocatalytic palladium membrane reactor flow cell".

EXAMPLE EMBODIMENTS

Aspects of the invention relate to methods and apparatuses of producing hydrogen peroxide ($H_2O_2$). The methods and apparatuses do not require the use of hydrogen gas ($H_2$) as a hydrogen source. Water is used as the hydrogen source in some embodiments.

In some embodiments the methods involve indirect production of hydrogen peroxide. In such embodiments a shuttle molecule is hydrogenated. The hydrogenated shuttle molecule is then caused to react in a chemical reaction to produce hydrogen peroxide. The hydrogen that hydrogenates the shuttle molecule may be produced by electrochemical dissociation of water or another hydrogen-containing compound. The resulting hydrogen ions may be reduced to hydrogen atoms before reacting to hydrogenate the shuttle molecule.

The methods may be performed in systems that include an electrochemical cell that is operative to produce hydrogen ions. The hydrogen ions are reduced to hydrogen atoms prior to participating in a reaction with shuttle molecules to yield hydrogenated shuttle molecules. The pairing of an electrochemical reaction which generates hydrogen ions at an anode with a chemical reaction in which hydrogen atoms participate in a hydrogenation reaction with a shuttle molecule can provide a highly efficient conversion of shuttle molecules into hydrogenated shuttle molecules.

Proof of concept demonstrations of the method using the electrochemical cell described herein have shown that 100% of conversion of shuttle molecule to hydrogenated shuttle molecule can be achieved.

Overview of Apparatus and Methods for Producing $H_2O_2$

Figure 1:
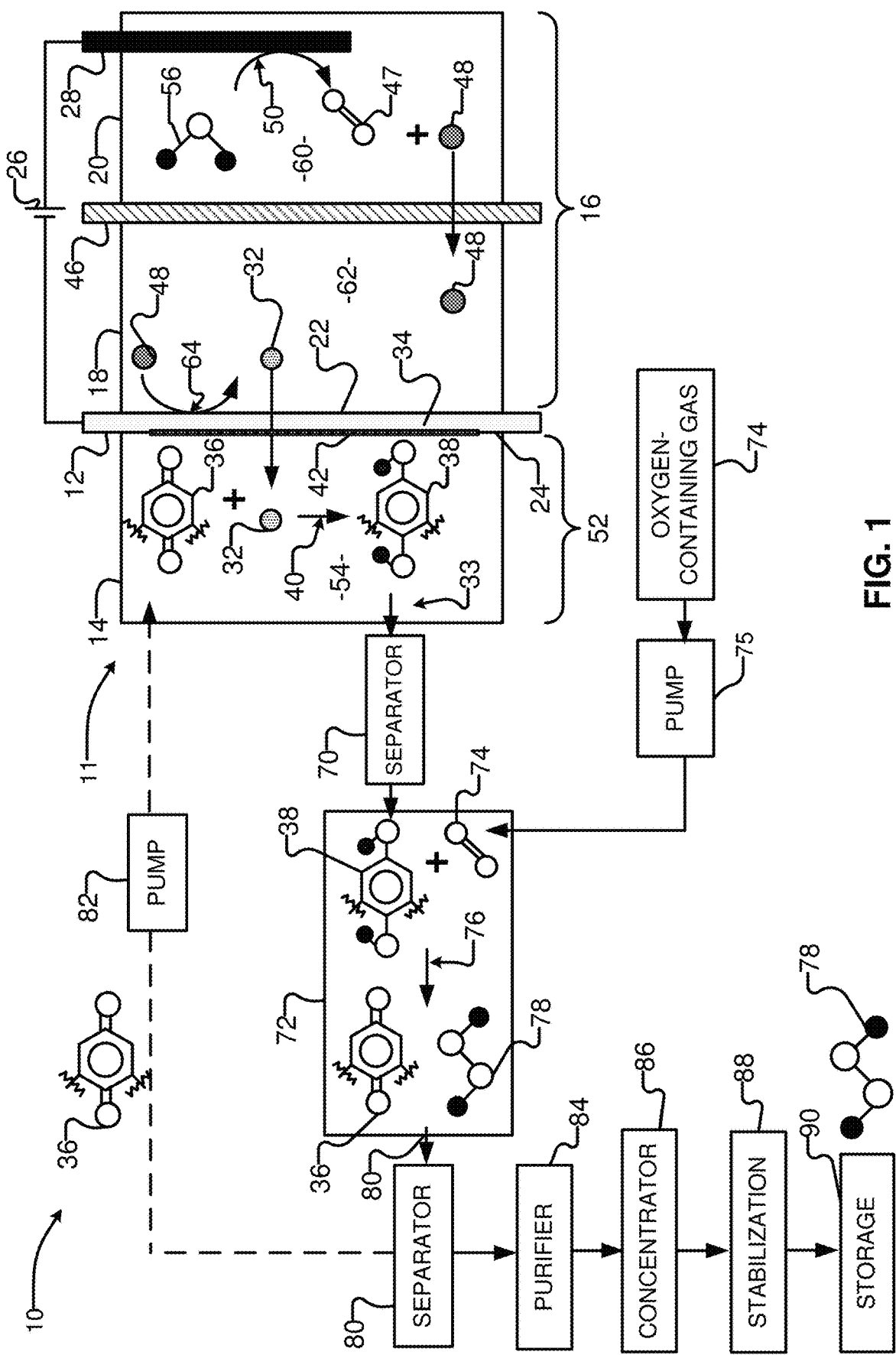
FIG. 1 is a schematic illustration showing an apparatus for synthesizing hydrogen peroxide according to an example embodiment of this invention.

FIG. 1 is a schematic diagram that illustrates an example system 10 that includes an electrochemical cell 11 for hydrogenating shuttle molecules 36. Hydrogenated shuttle molecules 38 may be supplied to a reaction chamber 72 where the hydrogenated shuttle molecules may react with an oxygen-containing gas to yield hydrogen peroxide.

Cell 11 comprises a hydrogen selective membrane 12 that separates a chemical reaction zone 52 comprising a chemical reaction chamber 14 from an electrochemical reaction zone 16. Electrochemical reaction zone 16 may be operated as described below to generate hydrogen ions and to supply the hydrogen ions to hydrogen selective membrane 12. Hydrogen selective membrane 12 is operative to pass atomic hydrogen into chemical reaction chamber 14. Membrane 12 selectively allows absorbed hydrogen atoms 32 to pass through membrane 12 while membrane 12 essentially blocks passage of all other ions, electrolytes and solvents. Membrane 12 may be referred to as a "hydrogen selective layer".

In currently preferred embodiments, hydrogen selective membrane 12 comprises or consists of a metallic membrane. In the following description membrane 12 is described as "metallic membrane 12".

In some embodiments, including the embodiment illustrated in FIG. 1 electrochemical reaction zone 16 comprises a cathode chamber 18 and an anode chamber 20. In some embodiments, metallic membrane 12 separates chemical reaction chamber 14 from cathode chamber 18. In such embodiments, a first surface 22 of metallic membrane 12 is exposed to cathode chamber 18 and an opposing second surface 24 of metallic membrane 12 is exposed to chemical reaction chamber 14.

An anode 28 is exposed to anode chamber 20. Anode 28 may comprise platinum metal, for example. Other suitable materials may be used as anode 28. For example, metals such as palladium metal and metal oxides such as a nickel oxide ($NiO_x$) or ruthenium (IV) oxide ($RuO_2$) may be used for anode 28. Carbonaceous materials such as graphite may also be used as anode 28.

A power source 26 is connected to apply a potential difference between anode 28 and metallic membrane 12. Metallic membrane 12 serves as a cathode.

Power source 26 may be configured to maintain a desired electric current between metallic membrane 12 and anode 28 and/or maintain a potential difference between metallic membrane 12 and anode 28 at a desired level or in a desired range.

Anode chamber 20 and cathode chamber 18 are optionally defined by an ion exchange membrane 46 that divides electrochemical reaction zone 16 into two parts. Ion exchange membrane 46 is a membrane that is selectively permeable to certain dissolved ions while blocking other ions or neutral molecules. In example embodiments, ion exchange membrane 46 is a cation exchange membrane. For example, membrane 46 may comprise a commercially available cation exchange membrane such as those marketed under the product name Nafion™. In example embodiments, ion exchange membrane 46 is selectively permeable to hydrogen ions. In the illustrated embodiments, ion exchange membrane 46 advantageously blocks oxygen gas 47 that is produced at anode 28 from migrating to cathode chamber 18 where the oxygen could undesirably be reduced at metallic membrane 12

A suitable anolyte 60 is supplied to anode chamber 20. A suitable anolyte 60 facilitates first electrochemical reaction 50 at anode 28 by providing electrons to reactant 56 to yield hydrogen ions ($H^+$). The pH at anode chamber 20 can range from 0 to 14. Suitable anolytes may be an acid or a base. Non-limiting examples of suitable anolytes include $H_2SO_4$, HCl, $H_3PO_4$, $KHCO_3$, KOH.

A suitable catholyte 62 is supplied to cathode chamber 18. A suitable catholyte 62 facilitates a second electrochemical reaction 64 at metallic membrane 12 by providing a medium within which hydrogen ions 48 travel to metallic membrane 12 to yield atomic hydrogens 32. A suitable catholyte 62 may be an acid. Non-limiting examples of suitable catholyte 62 include $H_2SO_4$, HCl, $H_3PO_4$. In some embodiments, the same electrolyte solution may be used as both anolyte 60 and catholyte 62. In other embodiments, different electrolyte solutions may be used as anolyte 60 and catholyte 62.

One or more reactants 56 are supplied to anode chamber 20 to participate in a first electrochemical reaction 50 at anode 28 to yield hydrogen ions 48. In some embodiments, first electrochemical reaction 50 is an oxidation reaction, for example a dehydrogenation reaction.

In some embodiments, reactant 56 comprises water ($H_2O$). In such embodiments, the electrochemical dissociation of water at anode 28 yields oxygen gas 47 and hydrogen ions 48. First electrochemical reaction 50 may however comprise any other oxidation reaction which produces hydrogen ions ($H^+$).

In some embodiments, oxygen gas 47 is supplied to apparatuses downstream from cell 11 for use as a reactant in other chemical reactions. For example, oxygen gas 47 may be supplied for reaction with hydrogenated shuttle molecule 38 to yield hydrogen peroxide.

Hydrogen ions 48 are released into anode chamber 20 and migrate through ion exchange membrane 46 (if present) to reach metallic membrane 12. Hydrogen ions 48 participate in a second electrochemical reaction 64 at metallic membrane 12 to yield hydrogen atoms 32. Second electrochemical reaction 64 is a reduction reaction. The hydrogen atoms are absorbed into metallic membrane 12 and permeate through metallic membrane 12 to second surface 24 where they are available to participate in chemical reactions with reactants in chemical reaction chamber 14. In doing so, hydrogen atoms 32 transition from first surface 22 into the bulk of a lattice 34, and transition to the opposing second surface 24 within chemical reaction chamber 14.

Chemical reaction chamber 14 comprises chemical reaction zone 52 containing shuttle molecules 36 and a suitable solvent 54. Shuttle molecules 36 undergo hydrogenation reaction 40 with hydrogen atoms 32 which have diffused through metallic membrane 12 to chemical reaction chamber 14 to yield a product 33 comprising hydrogenated shuttle molecules 38.

In some embodiments, hydrogenation reaction 40 takes place on second surface 24 of metallic membrane 12. The supply of shuttle molecules 36 at second surface 24 may be matched to the rate at which hydrogen atoms 32 are presented at second surface 24 so that substantially all hydrogen atoms 32 that reach second surface 24 participate in hydrogenation reaction 40. This advantageously reduces the likelihood of or prevents hydrogen atoms 32 from forming hydrogen gas ($H_2$) in chemical reaction chamber 14.

The balance between the availability of hydrogen atoms 32 and shuttle molecules 36 at second surface 24 may be adjusted to ensure that there are least enough shuttle molecules 36 to consume substantially all hydrogen atoms 32 that make it to second surface 14 by, for example, any of or any combination of: adjusting the availability of reactants 56 in anode chamber 20, adjusting power source 26 to alter the current driving electrochemical reaction 50, adjusting the concentration of shuttle molecules 36 in chemical reaction chamber 14, and/or adjusting the flow of solvent 54 that brings shuttle molecules 36 into chemical reaction chamber 54.

In some embodiments, a constant supply of shuttle molecules 36 is fed to chemical reaction chamber 14 to provide a sufficient amount of shuttle molecules 36 to be available for reaction with hydrogen atoms 32.

In some embodiments hydrogenation reaction 40 is catalyzed by the material of metallic membrane 12 and/or by a catalyst provided on or adjacent to second surface 24 of metallic membrane 12. The hydrogenated shuttle molecules 38 may be subsequently reacted to yield hydrogen peroxide at apparatus downstream from chemical reaction chamber 14.

Shuttle molecules 36 are molecules of a chemical compound which has reversible redox chemistry. Shuttle molecule 36 is a compound that can be reversibly oxidized and reduced.

Selection of a chemical compound to be used as shuttle molecule 36 may be based on one or more of the following:
- solubility in one or more of: a desired solvent, hydrogen peroxide, and separating agents used in downstream processes in the recovery of hydrogen peroxide;
- compatibility with hydrogenation reaction 40 and/or reaction with oxygen-containing gas to form hydrogen peroxide;
- strength of the compound as an oxidizing and/or reducing agent such as for example the rate of recovery for re-use;
- etc.

In some embodiments, shuttle molecule 36 is an organic compound. Shuttle molecule 36 may be an unsaturated organic compound. In some embodiments, shuttle molecule 36 is a quinone compound or a quinone derivative. "Quinone" is any member of a group of compounds which comprises an unsaturated benzene ring to which two oxygen atoms are bonded as carbonyl groups (i.e., a functional group composed of a carbon atom bonded to an oxygen atom by a double bond). Any suitable quinone compound or quinone derivatives may be used as shuttle molecule 36. The quinone may be non-substituted, or substituted with one or more functional groups such as hydroxyl, methyl, carbonyl, carboxyl, amino, phosphate, and sulfhydryl groups. Non-limiting examples of suitable quinones that may be used as shuttle molecule 36 include benzoquinones, diaziquone, indolequinone, naphthoquinones, anthraquinones, polyquinones, and their derivatives thereof.

In one example embodiment, shuttle molecule 36 is a tert-butyl-anthraquinone. In such example embodiment, tert-butyl-anthraquinone undergoes hydrogenation reaction 40 with hydrogen atoms 32 to form tert-butyl-anthrahydroquinone.

As an example, other suitable compounds that can be used as shuttle molecule 36 include azobenzene and phenazine and their derivatives.

Solvent 54 for performing hydrogenation reaction 40 may be selected based on one or more of the following:
- solubility of the desired shuttle molecule 36 and the corresponding hydrogenated shuttle molecule 38 in the solvent;
- compatibility with hydrogenation reaction 40 and downstream reaction with oxygen-containing gas and/or separation processes (e.g., low solubility in water is desired in embodiments in which water extraction methods are used);
- low solubility in aqueous hydrogen peroxide solutions;
- low volatility (e.g., high boiling point and flash point); and
- low toxicity.

In some embodiments, solvent 54 is an organic solvent or a mixture of organic solvents. Suitable solvents that can be used as solvent 54 include for example, an alcohol such as isopropanol, ethanol, chloroform and methanol, chlorinated molecules, hydrocarbons, ketones, or water.

With the sole exception of hydrogen which can be transported through metallic membrane 12, shuttle molecules 36, solvent 54 and hydrogenated shuttle molecules 38 in chemical reaction zone 52 can be kept isolated from reactant 56, anolyte 60 and catholyte 62 in electrochemical reaction zone 16. The separation between chemical reaction zone 52 and electrochemical reaction zone 16. The near complete isolation provided by metallic membrane 12 allows materials that are incompatible to be present at opposite sides of metallic membrane 12. For example, in embodiments in which shuttle molecule 36 is an organic compound such as a quinone, an organic solvent or a mixture of organic solvents may be selected as solvent 54. In such embodiments, it is possible to select an aqueous electrolyte as anolyte 60 and/or catholyte 62 without concerns of incompatibility.

Aspects of the invention relate to combining methods and apparatuses for hydrogenating a shuttle molecule with downstream processes and apparatuses for synthesizing hydrogen peroxide by reacting the hydrogenated shuttle molecules (e.g. with an oxygen-containing gas). FIG. 1 illustrates example apparatuses that may be arranged downstream of electrochemical cell 11 useful for reacting the hydrogenated shuttle molecules to yield hydrogen peroxide, and for processing the crude hydrogen peroxide to form a hydrogen peroxide product.

First product 33 comprising hydrogenated shuttle molecules 38 produced from hydrogenation reaction 40 and solvent 54 may be removed from chemical reaction chamber 14. First product 33 may be processed at a suitable separator 70 to remove undesired impurities such as any undesired byproducts of hydrogenation reaction 40. Separator 70 may implement any suitable separation methods and apparatuses may be used such as any physical separation methods (e.g., filtration and distillation) and/or chemical separation methods (e.g., extraction).

The mixture of hydrogenated shuttle molecule 38 and solvent 54 is supplied to a reactor 72, for example an oxidation reactor 72. An oxygen-containing gas 74 is supplied to reactor 72. A pump 75 may be arranged to deliver oxygen-containing gas 74 to reactor 72. Oxygen-containing gas 74 may be pure oxygen gas ($O_2$) or a mixture of gases comprising oxygen and one or more other gases. The one or more other gases may include an inert gas such as nitrogen gas ($N_2$). In some embodiments, oxygen-containing gas 74 comprises air.

Hydrogenated shuttle molecules 38 participates in a reaction 76 with oxygen-containing gas 74 to form a second product 80. Second product 80 comprises hydrogen peroxide 78.

In some embodiments, reaction 76 converts hydrogenated shuttle molecule 38 back to shuttle molecule 36 such that second product 80 also comprises regenerated shuttle molecule 36.

In some embodiments, reaction 76 is a redox reaction. Reaction 76 may be an auto-oxidation reaction (i.e., a chemical reaction in which a substance oxidizes spontaneously, for example in the absence of a catalyst). In some embodiments, reaction 76 is performed at a temperature in the range of from about 30° C. to 70° C.

One or more separators 80 may be arranged downstream of reactor 72 to separate hydrogen peroxide 78 from second product 80 comprising regenerated shuttle molecule 36 and in some embodiments, other impurities such as undesired byproducts. An example of an undesired by product is an overly hydrogenated shuttle molecule.

In some embodiments, separator 80 comprises an extraction column. An example is a liquid-liquid extraction column. In example embodiments, water is used as an extracting agent. Water may be supplied to the extraction column with second product 80. Hydrogen peroxide is miscible in water and may preferentially migrate into a water phase. An aqueous hydrogen peroxide product (i.e. a hydrogen peroxide-water layer) may be removed from the extraction column.

In some embodiments, a pump 82 is arranged to deliver regenerated shuttle molecules 36 back to chemical reaction chamber 14 for use in subsequent hydrogenation reactions 40. In some embodiments, solvent 54 containing the regenerated shuttle molecules 36 is purified to remove impurities before recycling back to chemical reaction chamber 14.

In some embodiments, a purifier 84 is arranged downstream of separator 80. Purifier 84 may be operable to purify the aqueous hydrogen peroxide product to remove impurities. Such impurities may include for example solvent 54, shuttle molecule 36 and/or hydrogenated shuttle molecule 38. Any suitable apparatuses and methods suitable for purifying the aqueous hydrogen peroxide product may be used. In one example embodiment, purifier 84 comprises a scrubber. An organic solvent such as toluene may be used as a scrubbing agent to remove organic impurities contained in the aqueous hydrogen peroxide product.

A concentrator 86 may be arranged to concentrate the aqueous hydrogen peroxide product. In example embodiments, concentrator 86 comprises a distillation apparatus. Distillation apparatus may for example comprise a sample reservoir containing the aqueous hydrogen peroxide product to be distilled, a heat source, a rectification column, a condenser, and a collector for receiving the concentrated hydrogen peroxide product. A vacuum source may be provided to reduce the pressure during the distillation process. In such example embodiments, hydrogen peroxide is concentrated by evaporating at least partially the aqueous hydrogen peroxide product contained in the sample reservoir. The vapors from the evaporated product are rectified by passing through the rectification column, and are collected as hydrogen peroxide which are of higher concentration and/or purity.

In some embodiments, a device 88 is provided for contacting a stabilizing agent with the recovered hydrogen peroxide. A suitable stabilizing agent may be provided to deactivate the catalytic activities which could result in the decomposition of hydrogen peroxide when hydrogen peroxide especially in the presence of impurities such as metal ions. Examples of suitable stabilizing agents that may be used include sodium citrate, sodium malonate, sodium phytate, dipicolinic acid (DPA), ethylenediamine tetra acetic acid compounds (EDTA), etc.

A storage container 90 may be arranged downstream of device 88 to collect the stabilized hydrogen peroxide product.

Example Constructions for Metallic Membrane 12

Metallic membrane 12 is made of a material which is selectively permeable to absorbed hydrogen atoms 32.

Metallic membrane 12 may serve as all of: 1) a cathode; 2) a hydrogen selective layer which allows passage of hydrogen atoms (i.e. any isotope of hydrogen) and blocks other reactants including hydrogen ions; 3) a physical barrier which separates a solvent and the shuttle molecule in the chemical reaction chamber from the different solution or solutions used in the electrochemical compartment; and 4) a catalyst which helps to promote the hydrogenation reaction. The physical barrier advantageously allows for the use of solvent or solvents in the chemical reaction chamber that is incompatible with the electrolyte solution or solutions selected for the electrochemical compartment.

Metallic membrane 12 is made up of at least one metal. The metal, may example, have a crystalline lattice that provides interstitial sites that can accept hydrogen atoms. In example embodiments, metallic membrane 12 is made from palladium (Pd) metal. Palladium is highly selective for passing hydrogen and is impermeable to most practical solvents and electrolytes. Palladium metal has a face centered cubic crystal lattice that is capable of hosting hydrogen atoms up to a hydrogen/palladium ratio (H:Pd) of approximately 0.7 ($PdH_{0.7}$). Another example metal that may be used as metallic membrane 12 is a hydrogen permeable palladium alloy. Examples of palladium alloys that may be used to make metallic membrane 12 include but are not limited to: Pd—Ag, Pd—Sn, Pd—Au, Pd—Pb, Pd—B, Pd—Pt, Pd—Rh, Pd—Ni and Pd—Cu. Other metals that have high permeability to hydrogen include niobium, vanadium and tantalum.

In some embodiments, metallic membrane 12 is formed of one or more layers. The one or more layers may be formed by electrodeposition and/or sputtering. The one or more layers may comprise a metal such as palladium or a palladium alloy and/or a layer of co-catalyst 42.

In some embodiments, layer of catalyst 42 is applied on second surface 24 of metallic membrane 12 to promote hydrogenation reaction 40 in chemical reaction chamber 14. Catalyst 42 may be called a "co-catalyst". Co-catalyst 42 may be porous. Co-catalyst 42 may be heterogeneous.

In some embodiments, co-catalyst 42 comprises one or more transition metals. "Transition metals" include elements that have (or readily form) partially filled d-orbitals, for example those located in groups 3-12 of the periodic table. Examples of suitable elements that may be used as co-catalyst 42 include but are not limited to gold, iridium, palladium, platinum and ruthenium. In some embodiments, co-catalyst 42 comprises a palladium alloy. In one example embodiment, the palladium alloy is a gold palladium (AuPd) alloy.

In some embodiments, the thickness of the layer of co-catalyst 42 is in the range of from 3 nm to 20 nm, including any value therebetween, such as 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, etc.

In some embodiments, metallic membrane 12 comprises a self-supporting member made of a hydrogen selective material as described herein. The member may, for example have the form of a sheet, plate, corrugated sheet or plate, casting or the like. In some embodiments, metallic membrane 12 is formed on or attached to a permeable substrate that helps to support metallic membrane 12.

In example embodiments, metallic membrane 12 is formed by electrodepositing one or more layers of palladium on one or both sides of a palladium foil or a hydrogen selective membrane. Such membrane 12 may be called a "Pd/Pd membrane", Without being bound to theory, the electrodepositing of one or more layers of palladium may result in a morphology that provides greater surface area of the membrane. The one or more layers may for example be made of palladium electrodeposited from a solution comprising a palladium salt. In example embodiments, the palladium salt comprises palladium chloride ($PdCl_2$).

In some embodiments, the layer of co-catalyst 42 comprises one or more of co-catalysts selected from: gold, and a gold palladium (AuPd) alloy. Gold or a mixture of gold and palladium may for example be sputtered on a Pd/Pd membrane. Without being bound to theory, providing a layer of Au or AuPd alloy on metallic membrane 12 serves to both increase the surface area of metallic membrane 12 and suppress $H_2O_2$ decomposition by suppressing O—O bond cleavage. The atomic ratio Au:Pd of the AuPd alloy may for example be in the range of from 1:0 to 20:0, including any value therebetween such as 2:0, 3:0, 4:0, 5:0, 6:0, 7:0, 8:0, 9:0, 10:0, 11:0, 12:0, 13:0, 14:0, 15:0, 16:0, 17:0, 18:0, 19:0, etc.

Any suitable method for electro-depositing and/or sputter-depositing palladium salt and/or the layer of co-catalyst on a hydrogen selective membrane may be used. In an example electro-deposition process, an Ag/AgCl electrode is used as a reference electrode and a Pt mesh electrode is used as the counter electrode. The electrodeposition may be performed in an acidic $PdCl_2$ solution. For example, the solution may comprise 15.9 mM $PdCl_2$ dissolved in 1M HCl. Roughly −0.2 V vs. Ag/AgCl potential is applied to the electrodes. The electrodeposition is complete when a desired thickness of palladium has been deposited. Completion may be determined by measuring a charge passed in the electrodeposition circuit. For example some satisfactory electrodeposited palladium layers were made by terminating the electrodeposition when a charge of about 7.5 $C/cm^2$ of the membrane had passed in the circuit.

In some embodiments, an electrodeposition current in the range of about 20 mA to about 100 mA is applied to electrodeposit a co-catalyst on metallic membrane 12. The magnitude of the electrical current may be set based on the type of co-catalyst to be deposited. For example, the electrical current may be maintained at about 30 mA in embodiments in which gold and or platinum are selected as the co-catalyst and 70 mA in embodiments in which iridium is selected as the co-catalyst.

In some embodiments, the co-catalyst is sputter-deposited at a rate in a range of from about 0.1 to about 1 mm/s. In example embodiments, the co-catalyst is sputter-deposited at a rate of about 0.2 mm/s.

In example embodiments, membrane 12 comprises a palladium foil. The density of the palladium foil may be about 11.9 g/cm$^3$. The thickness of the palladium foil may for example be in the range from 25 μm to 150 μm.

Example Methods for Producing $H_2O_2$

Figure 2A:
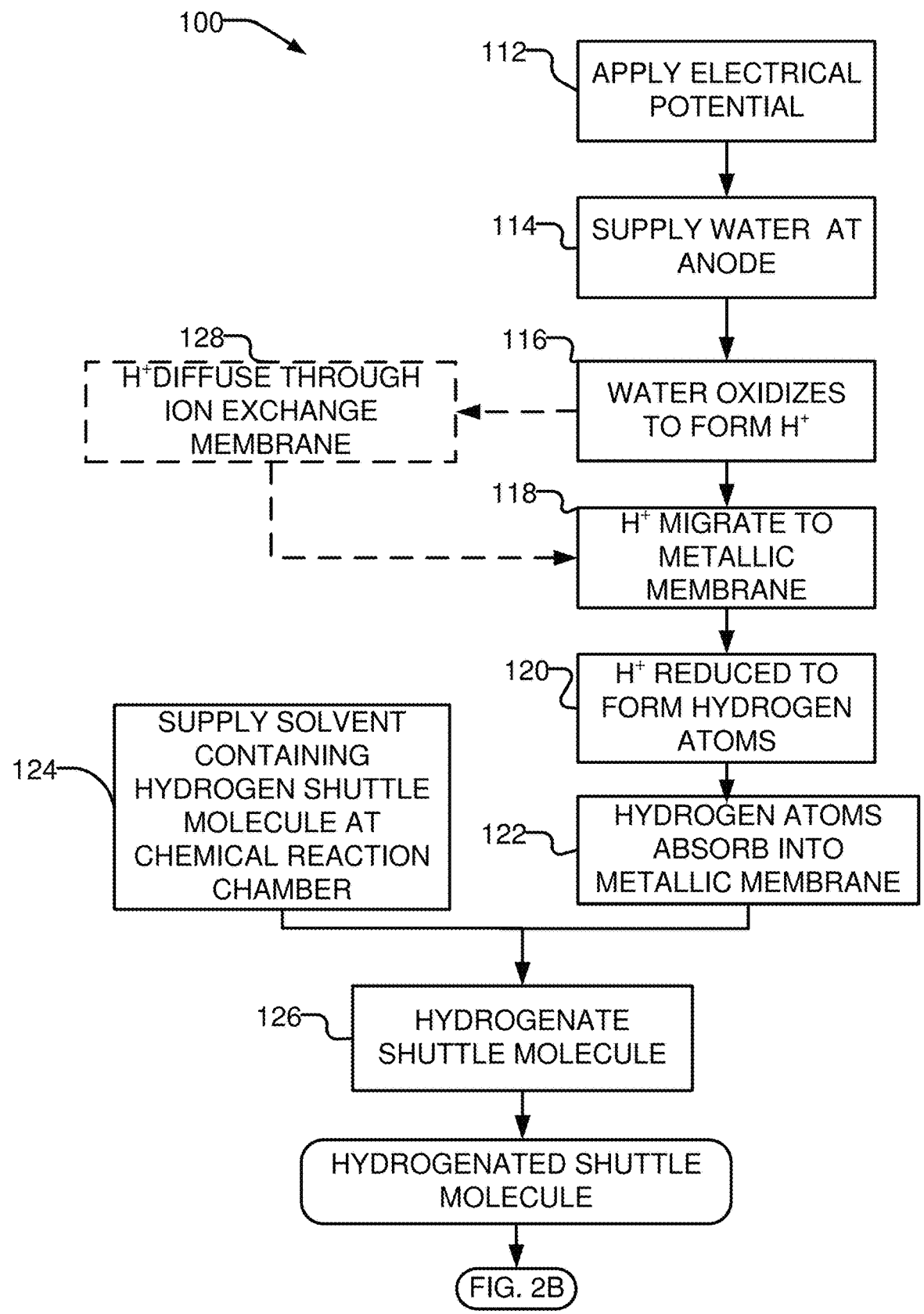
FIG. 2A is a flow chart showing the steps of a method for producing a hydrogenated shuttle molecule using the FIG. 1 electrochemical cell according to an example embodiment of the invention.
Figure 2B:
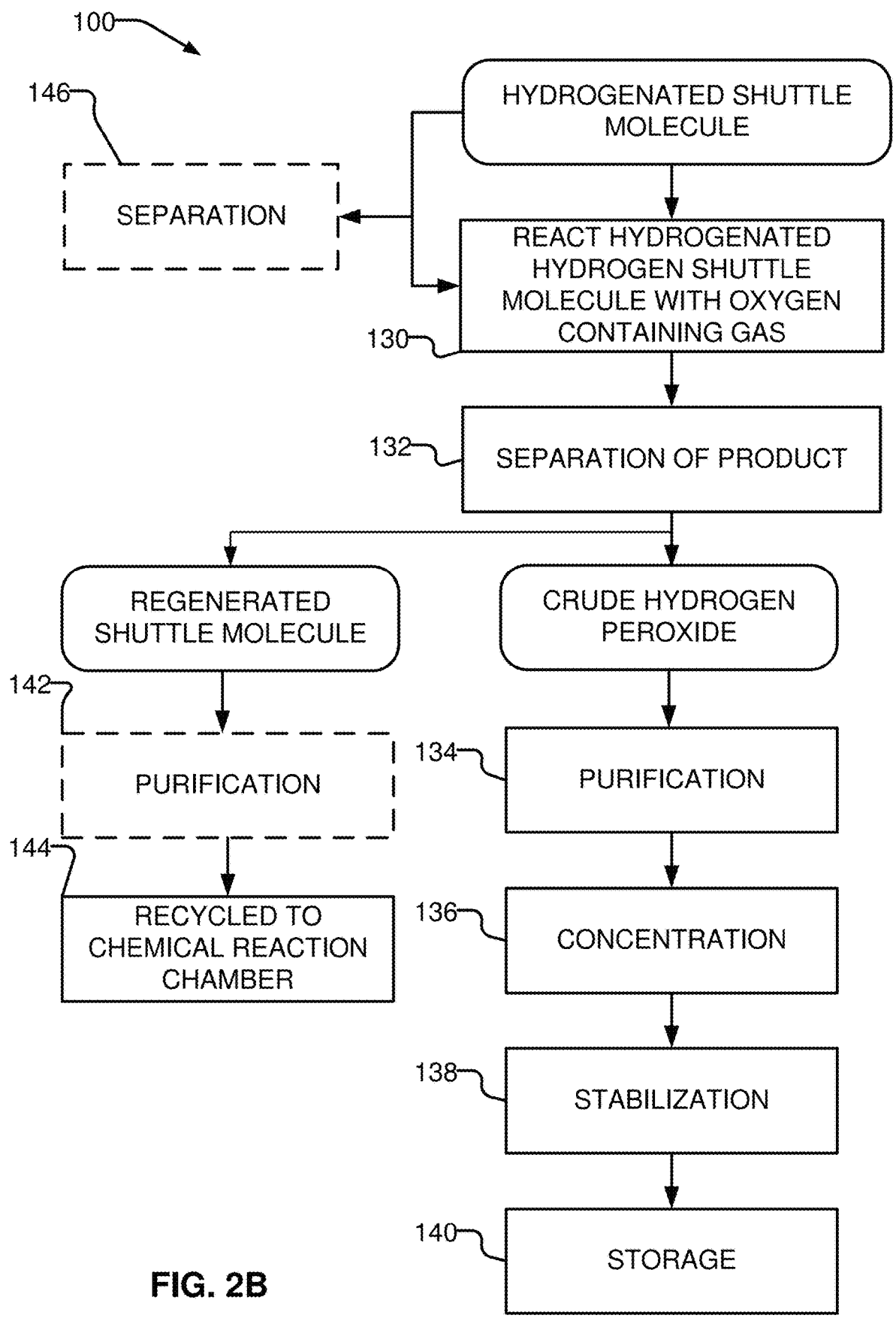
FIG. 2B is a flow chart showing the steps of a method for producing hydrogen peroxide using a hydrogenated shuttle molecule according to an example embodiment of the invention.

FIGS. 2A and 2B are flow charts illustrating the steps of an example method 100 of producing hydrogen peroxide. Referring to FIG. 2A, in block 112, an electrical current and/or potential is applied between an anode and a metallic membrane which serves as a cathode. In block 114, a hydrogen-containing compound such as water is supplied at the anode. In block 116, the hydrogen-containing compound undergoes an oxidation reaction to produce hydrogen ions ($H^+$). The hydrogen ions ($H^+$) migrate toward the metallic membrane (block 118). In block 120, the hydrogen ions ($H^+$) undergo a reduction reaction on a first surface of the metallic membrane to form hydrogen atoms. The hydrogen atoms pass through the metallic membrane as absorbed hydrogen atoms and appear on a second surface of the metallic membrane (block 122). In block 124, a solvent comprising a shuttle molecule is supplied to a chemical reaction chamber. The shuttle molecule undergoes a chemical reaction by reacting with the hydrogen atoms to produce a hydrogenated shuttle molecule in the chemical reaction chamber (block 126). The oxidation reaction at block 116 may be performed in tandem with the reduction reaction at block 120 and the chemical reaction at block 126.

As described above, the chemical reaction between the shuttle molecules and the hydrogen atoms typically occurs on the second surface of the metallic membrane (in block 126). The method may comprise balancing the supply of hydrogen atoms and the supply of shuttle molecules as described above. In some embodiments, a constant supply of shuttle molecules is fed to chemical reaction chamber to provide a sufficient amount of shuttle molecules to be available for reaction with substantially all hydrogen atoms that reach the second surface. The flow rate at which the shuttle molecules or the solvent containing the shuttle molecules is supplied into chemical reaction chamber may be adjusted to ensure that a sufficient and/or an excess amount of shuttle molecules is present in react with the hydrogen atoms.

In some embodiments, the hydrogen ions ($H^+$) produced at the anode in block 116 migrate to an ion exchange membrane and pass through the ion exchange membrane (block 128) before migrating to the metallic membrane to participate in the reduction reaction at block 120.

Referring to FIG. 2B, in block 130, the hydrogenated shuttle molecule produced in chemical reaction chamber at block 126 reacts with an oxygen-containing gas. The oxidation reaction yields a product comprising hydrogen peroxide. The product may also comprise regenerated shuttle molecules. In block 132, the hydrogen peroxide is separated from impurities such as the solvent, regenerated shuttle molecule and/or unreacted hydrogenated shuttle molecule. Such separation may for example be done by a water extraction process. The crude hydrogen peroxide may be purified, concentrated and stabilized (blocks 134-138) to yield a recovered hydrogen peroxide product before storage at block 140.

In some embodiments, the mixture comprising the regenerated shuttle molecule and solvent is recycled to the chemical reaction chamber for re-use in subsequent chemical reactions (block 144). The mixture comprising the regenerated shuttle molecule and solvent may optionally be purified to remove impurities prior to returning to the chemical reaction chamber (block 142).

In some embodiments, the products of the chemical reaction released into chemical reaction chamber comprising the hydrogenated shuttle molecule may be separated to remove impurities (block 146) before reacting with the oxygen-containing gas at block 130.

Method 100 may be tuned to optimize one or more of product selectivity, current efficiency and reaction rate of each of the electrochemical reactions and chemical reactions by adjusting one or more of:

characteristics of the metallic membrane such as the particular metal or metals used to make the membrane hydrogen selective and its surface area, density and thickness, and/or additional catalysts present; and/or conditions of the flow cell such as temperature, pH, pressure, etc.; and/or the type of solvent and electrolyte in the area where each reaction takes place; and/or flow rate of the shuttle molecule and/or solvent; and/or flow rate and/or composition of the reactants and/or solvent and/or catholyte and/or anolyte; and/or characteristics of the ion exchange membrane such as the thickness, porosity, etc.; and/or electrical operating conditions such as the applied electrical potential; and/or characteristics of the cathode and/or anode electrodes such as the material and method of fabrication; and/or nature of the cathode and/or anode catalyst;

etc.

At least some of these factors may be separately optimized for each of the electrochemical and chemical reactions to achieve high rates of formation of the products and/or high selectivity of the desired products at each of the electrochemical and the chemical reaction chambers. The physical barrier provided by metallic membrane 12 advantageously allows the electrochemical and chemical reaction conditions in chemical reaction chamber 14 and electrochemical reaction zone 16 to be controlled independently. Examples of conditions that can be independently controlled are: catalysts, choice of solvent, choice of electrolytes or other additives, etc. Although apparatus as described herein may be operated at low temperatures (e.g. room temperature) and at low pressures (e.g. atmospheric pressure) it is possible to operate one or both electrochemical reaction zone 16 and chemical reaction zone 52 of metallic membrane 12 at pressures above or below atmospheric pressure and/or at temperatures above and/or below room temperature. Within limits imposed by the physical design of metallic membrane 12, it is possible to independently control temperature and/or pressure on either side of metallic membrane 12.

In some embodiments, an electrical potential difference applied between the anode and the metallic membrane introduces a current density at the metallic membrane of at least about 100 mA cm$^{-2}$, For example, in some embodiments the current density at the metallic membrane is maintained in the range of about 100 mA/cm$^{-2}$ to about 500 mA cm$^{-2}$, including any value therebetween such as 100 mA cm$^{-2}$, 150 mA cm$^{-2}$, 200 mA cm$^{-2}$, 250 mA cm$^{-2}$, 300 mA cm$^{-2}$, 350 mA cm$^{-2}$, 400 mA cm$^{-2}$, 450 mA cm$^{-2}$, etc. In some embodiments, the current density is maintained at a level of at least 100 mA cm$^{-2}$.

In some embodiments, electrochemical cell 11 is maintained at a temperature in a range of from about 25° C. to about 80° C., including any value therebetween such as 30° C., 35° C., 40° C., 45° C., 50° C., 55° C., 60° C., 65° C., 70° C., 75° C., etc.

In some embodiments, the concentration of the hydrogen shuttle molecule in the solvent is in the range of from about 0.1 M to about 1 M, including any value therebetween such as 0.2 M, 0.3 M, 0.4 M, 0.5 M, 0.6 M, 0.7 M, 0.8 M, 0.9 M, etc.

Aspects of this invention relate to apparatuses and methods for producing hydrogen peroxide ($H_2O_2$) by pairing an electrochemical reaction which generates hydrogen ions from the electrochemical dissociation of water ($H_2O$) at an anode with a chemical reaction in which hydrogen atoms participate in a hydrogenation reaction with oxygen gas ($O_2$) to directly produce hydrogen peroxide.

Figure 3:
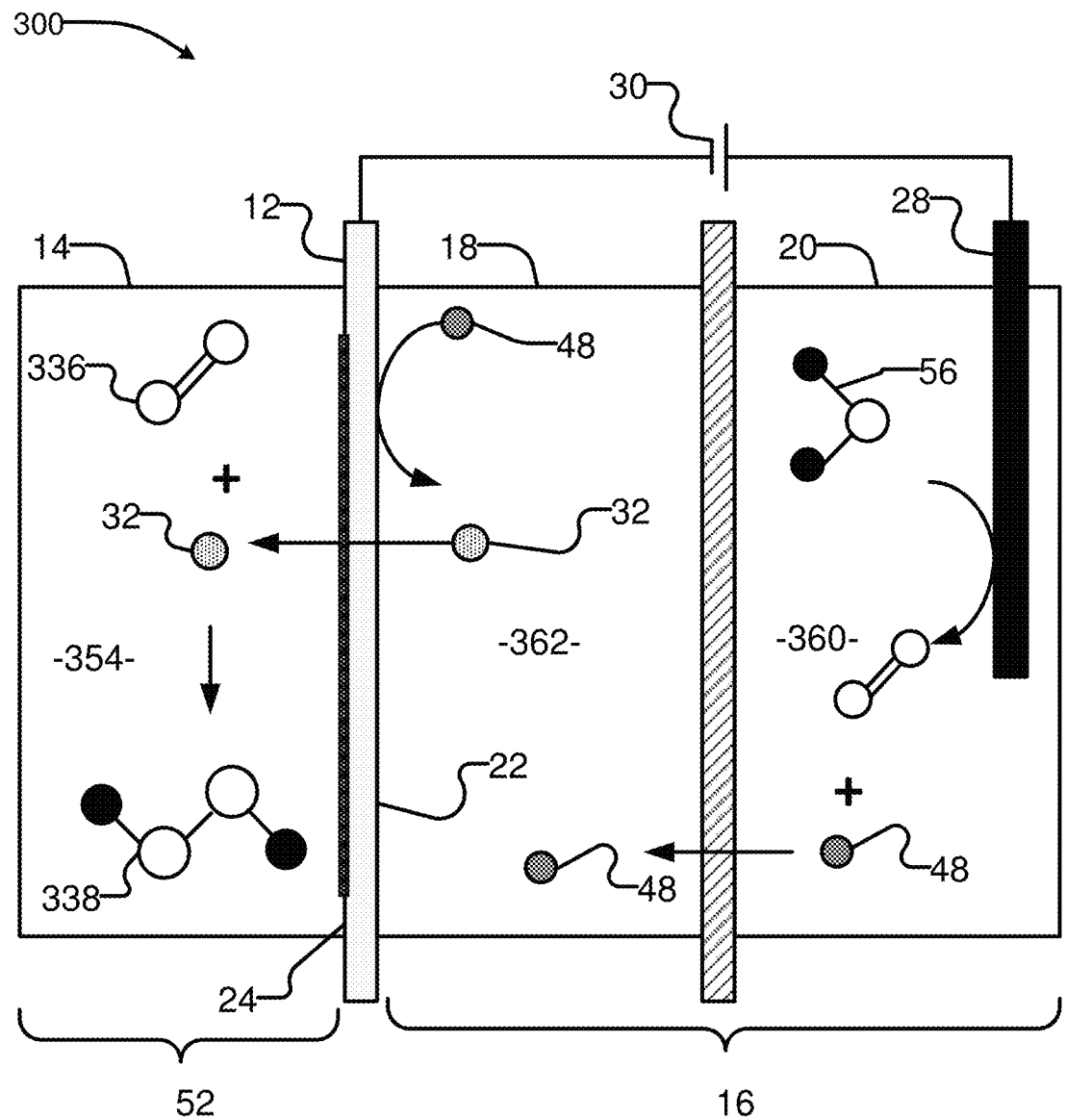
FIG. 3 is a schematic diagram of an electrochemical cell showing chemical reactions that may occur in each of the reaction zones of the cell according to an example embodiment.

FIG. 3 is a schematic diagram illustrating an example electrochemical cell 300 which may be used to produce hydrogen peroxide directly without first hydrogenating a shuttle molecule. The structure of electrochemical cell 300 can be the same or similar to that of electrochemical cell 11 so each of the components of cell 300 will not discussed in detail again.

In operation, hydrogen ions 48 are produced at an anode 28 in an anode chamber 20 of cell 300. Hydrogen ions 48 may be produced from the electrochemical dissociation of water or another hydrogen-containing compound 56. Hydrogen ions 48 may migrate to a first surface 22 of a metallic membrane 12 and undergo a reduction reaction to form hydrogen atoms 32. First surface 22 may be exposed in a cathode chamber 18. Hydrogen atoms 32 enter the hydrogen selective layer 12 as absorbed hydrogen atoms and pass through metallic membrane 12 to a chemical reaction chamber 14. Upon reaching chemical reaction chamber 14, hydrogen atoms 32 may participate in a hydrogenation reaction with gaseous oxygen ($O_2$) 36 to yield hydrogen peroxide 338.

In some embodiments, hydrogen peroxide 338 produced in chemical reaction chamber 354 is caused to react with a carbon-containing compound to yield one or more useful products other than hydrogen peroxide. Such reaction may for example be an oxidation reaction. Hydrogen peroxide 338 may serve as an oxidant to mediate the oxidation reaction of a carbon-containing compound. The reaction may occur in the presence of a catalyst. In some embodiments, hydrogen peroxide 338 contained in solvent 354 is removed from cell 300. Hydrogen peroxide 338 contained in solvent 354 may be supplied to a separate electrochemical cell for reaction with a carbon-containing compound to yield one or more useful products.

Gaseous oxygen 336 or a mixture comprising gaseous oxygen 336 and a solvent 354 or a mixture of solvents 354 is supplied to chemical reaction chamber 14.

In some embodiments, solvent 354 is an aqueous solvent, an organic solvent, or a mixture thereof. Any suitable solvent 354 may be selected. A suitable solvent 354 may for example be selected based on one or more of the following:
solubility with gaseous oxygen ($O_2$);
compatibility with the hydrogenation reaction between hydrogen atoms and gaseous oxygen; and
solubility with hydrogen peroxide ($H_2O_2$).

Examples of suitable solvents 354 are one or more of an alcohol, chlorinated molecules, hydrocarbons, ketones and water. In some embodiments, solvent 354 comprises an alcohol. In some embodiments, solvent 354 comprises a mixture comprising alcohol and water. The ratio of alcohol to water may be adjusted to optimize the solubility of the mixture with gaseous oxygen 336. In an example embodiment, solvent 354 is methanol. In another example embodiment, solvent 354 comprises a mixture of methanol and water.

The electrochemical reactions are performed in the presence of a suitable electrolyte. Anolyte 360 and catholyte 362 may be any suitable electrolyte. A suitable electrolyte may for example be an acid.

In some embodiments, an operating pressure at chemical reaction chamber 14 is at an ambient pressure (e.g. 1 atm). In some embodiments, the operating pressure at chemical reaction chamber 14 is increased to an above-ambient pressure so as to increase the pressure of oxygen-containing gas 336. The pressure of oxygen-containing gas 336 may for example be maintained within a range of from about 5 psi to about 30 psi, including any value therebetween such as 8 psi, 10 psi, 12 psi, 14 psi, 16 psi, 18 psi, 20 psi, 22 psi, 24 psi, 26 psi, 28 psi, etc. Without being bound to theory, the increase in the pressure of oxygen-containing gas 336 increases the solubility of oxygen-containing gas 336 in solvent 354.

FIG. 4 is a schematic diagram illustrating an example reactor 400 which may be used to perform paired electrochemical and chemical reactions in the production of hydrogen peroxide ($H_2O_2$). Reactor 400 may comprise a hydrogenation reaction zone 402, an anode reaction zone 406 and a cathode reaction zone 404 between hydrogenation and anode reaction zones 402, 406. Anode reaction zone 406 and cathode reaction zone 404 form an electrochemical reaction zone 408. An anode (not shown) may be exposed to anode reaction zone 406, for example through anode port 407. A metallic membrane (not shown) which acts as a cathode is positioned between hydrogenation reaction zone 402 from cathode reaction zone 404. In some embodiments, an ion exchange membrane (not shown) separates cathode reaction zone 404 from anode reaction zone 406. Hydrogenation reaction zone 402 may comprise an inlet 410. A reactant such as oxygen gas or a mixture comprising a solvent and a shuttle molecule is supplied to hydrogenation reaction zone 402 through inlet 410. In some embodiments, hydrogenation reaction zone 402 is filled with a suitable solvent, and a source of oxygen gas is supplied into reaction zone 402 through inlet 410. In other embodiments, a mixture comprising oxygen gas and a suitable solvent may be supplied into reaction zone 402 through inlet 410.

In some embodiments, anode reaction zone 406 contains water and a suitable electrolyte. In some embodiments, anode reaction zone 406 comprises an inlet (not shown). The water and/or electrolyte may be supplied to anode reaction zone 406 through the inlet. In some embodiments, cathode reaction zone 404 contains a suitable electrolyte. Reactor 400 may be called a "H-cell".

Figure 5:
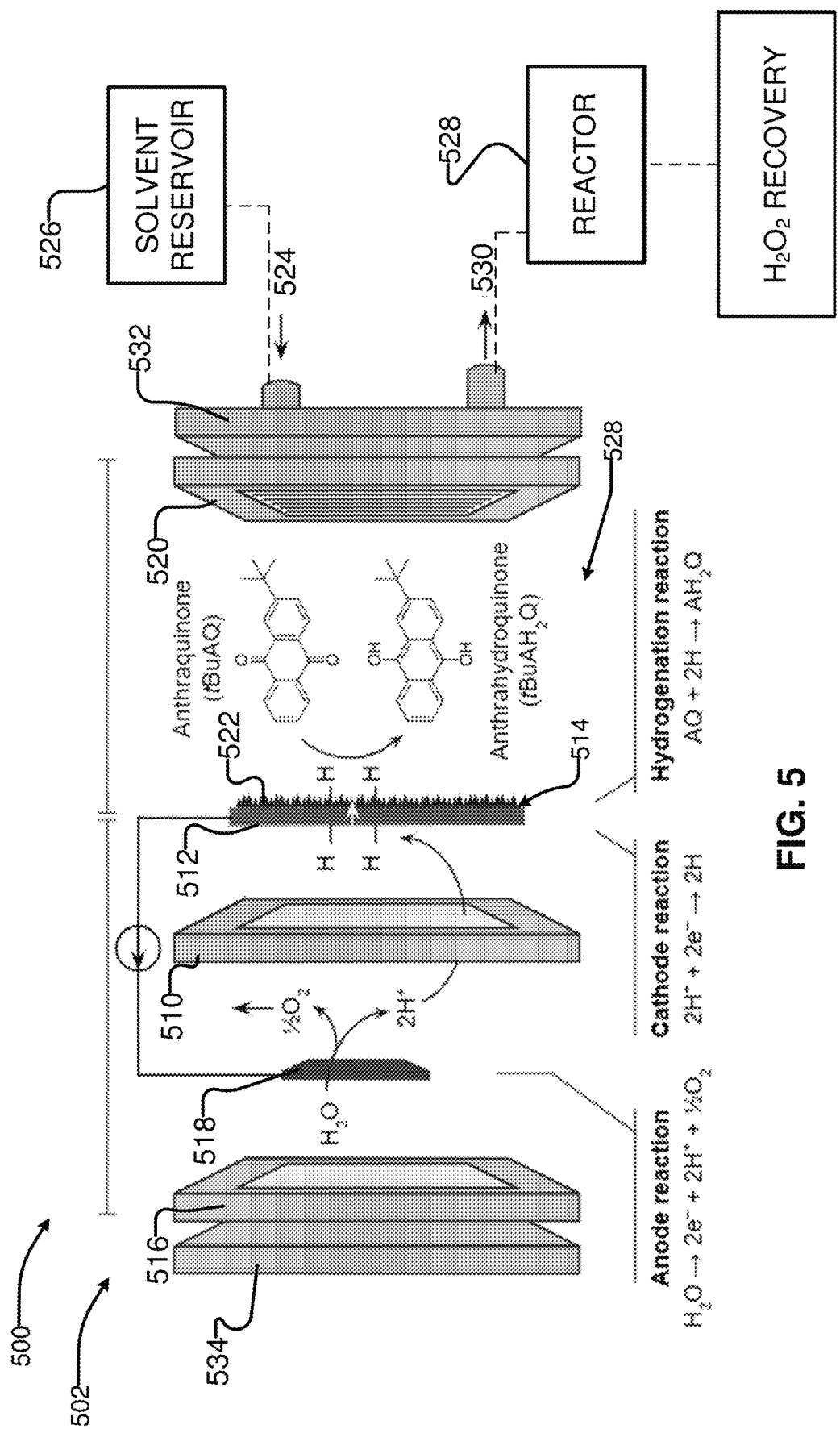
FIG. 5 is an exploded view of a reactor according to another example embodiment of the invention.

FIG. 5 is a schematic diagram showing another example reactor which may be used to perform paired electrochemical and chemical reactions in the production of hydrogen peroxide ($H_2O_2$). Referring to FIG. 5, in some embodiments, electrochemical cell 500 is a flow cell that comprises a cathode plate 510 that is pressed against a first surface 512 of metallic membrane 514. An anode plate 516 may be pressed against an anode 518. A hydrogenation flow plate 520 may be pressed against an opposing second surface 522 of metallic membrane 514. An inlet 524 of hydrogenation flow plate 520 may be fluidly connected to a solvent reservoir 526. Solvent reservoir 526 contains shuttle molecules. Solvent reservoir 526 containing shuttle molecules may be fluidly connected to deliver solvent 526 to chemical reaction chamber 528 by flowing through the inlet 524 of hydrogenation flow plate 520. An outlet 530 of hydrogenation flow plate 520 may be fluidly connected to a collector (not shown). Product comprising hydrogenated shuttle molecule dissolved in solvent may flow out of cell through outlet 530 of hydrogenation flow plate 520.

The product comprising hydrogenated shuttle molecule may be supplied to a reactor 528 for reaction with an oxygen-containing gas. This reaction yields a product comprising hydrogen peroxide. The reaction may regenerate shuttle molecule. The product is separated to recover hydrogen peroxide. The product may undergo one or more of separation, purification, concentration and/or stabilization. The recovered hydrogen peroxide may be stored in a collector. The regenerated shuttle molecule may be recycled back to chemical reaction chamber 528 through inlet 524 of hydrogenation flow plate 520.

In example embodiments, anode plate 516 comprises an anode chamber which contains the anolyte comprising a hydrogen-containing compound such as water as the reactant. Cathode plate 510 may comprise a cathode chamber which contains the catholyte In other embodiments, anode plate 516 may be an anode flow plate which includes an inlet that is fluidly connected to an anolyte reservoir. Anolyte reservoir may comprise water and/or anolyte. Water and/or the anolyte may be delivered to anode 518 by flowing through the inlet of anode flow plate. Anode flow plate may also include an outlet. The outlet may be fluidly connected to a drain. Unreacted water and/or unwanted materials may flow out through the outlet.

Housings 532, 534 may be arranged to press against hydrogenation flow plate and anode plate 520, 516 respectively.

The invention is further described with reference to the following specific examples, which are not meant to limit the invention, but rather to further illustrate it.

Examples

Example 1—Indirect Hydrogen Peroxide Synthesis

An electrochemical cell of the type illustrated in FIG. 1 and the method illustrated in FIG. 2A were used to oxidize water 56 at anode 28 which releases hydrogen ions ($H^+$) in anode chamber 20, and to hydrogenate shuttle molecule 36 in chemical reaction chamber 14. In the example embodiment, metallic membrane 12 which separates the chemical and electrochemical reaction zones is a palladium membrane.

Metallic membrane 12 used in the example embodiments was formed from a 1 oz palladium wafer bar which was rolled to palladium foil with a thickness of about 150 μm. The palladium foil was then rolled to a thickness of about 25 μm. The 25 μm thickness was annealed in an inert atmosphere (under argon, Ar) at 850° C. for 1.5 hours. Before use, the annealed foils were cleaned using 0.5:0.5:1 vol. % concentration of $HNO_3:H_2O:30\%$ $H_2O_2$. The co-catalyst comprises palladium. The co-catalyst was electrodeposited on the palladium foil. The electrodeposition was performed in 15.9 mM $PdCl_2$ in 1 M HCl solution. The foil was placed into the cell as the working electrode. An Ag/AgCl electrode was used as a reference electrode and a Pt mesh electrode was used as the counter electrode. Roughly −0.2 V vs. Ag/AgCl potential was applied to the electrodes. The electrodeposition is complete when a charge of about 7.5 $C/cm^2$ has been passed in the circuit, which provided about 5 mg of co-catalyst material on the palladium foil.

Example 1.1—Comparison of Conversion Rates Using Different Solvents

In these example embodiments, benzoquinone was selected as shuttle molecule 36. Benzoquinone was dissolved in each of isopropanol, ethanol, methanol and chloroform as solvent 54. The concentration of benzoquinone in chemical reaction chamber 14 was 25 mmol. Water was supplied to anode 28. 1 M $H_2SO_4$ was selected as the electrolyte used as anolyte 60 and catholyte 62 in electrochemical reaction zone 16. An applied current or electrical potential of about 150 mA was applied between metallic membrane 12 and anode 28 (Pt mesh) for four hours. The reactions were carried out in air at room temperature. Samples were taken after four hours, and were analyzed by GC-MS. Table 1 compares the production rates (mmol $h^{-1}$) of hydroquinone from the hydrogenation of benzoquinone using the different types of organic solvents as the solvent in chemical reaction chamber 14.

TABLE 1

| | Isopropanol | Ethanol | Methanol | Chloroform |
|---|---|---|---|---|
| Hydroquinone production (mmol $h^{-1}$) | 0.38 | 0.40 | 0.39 | 0.21 |

Example 1.2—Comparison of Conversion Rates Using Different Operating Temperatures and Duration In these example embodiments, tert-butyl anthraquinone was selected as shuttle molecule 36. Tert-butyl anthraquinone was dissolved in a mixture of solvents comprising 1:1 v/v xylene and diisobutylcarbinol (DIBC). The concentration of tert-butyl anthraquinone in chemical reaction chamber 14 was 0.25 M. Water was supplied to anode 28. 1 M $H_2SO_4$ was selected as the electrolyte used as anolyte 60 and catholyte 62 in electrochemical reaction zone 16. Five sets of operating conditions were experimented. FIGS. 5A-5E are plots of the conversion rate (%) of tert-butyl hydroanthraquinone from tert-butyl anthraquinone measured as a function of time of the experiment (h).

In the example experiments which the results are shown in FIGS. 6A-6D, the electrolysis was performed in a flow reactor. In such example embodiments, chemical reaction chamber 14 is a flow-through reaction zone in which the solvent containing tert-butyl anthraquinone is circulated through chamber 14. In these example embodiments, the solvent containing tert-butyl anthraquinone is circulated through chamber 14 at a rate of 60 mL $min^{-1}$.

Figure 6A:
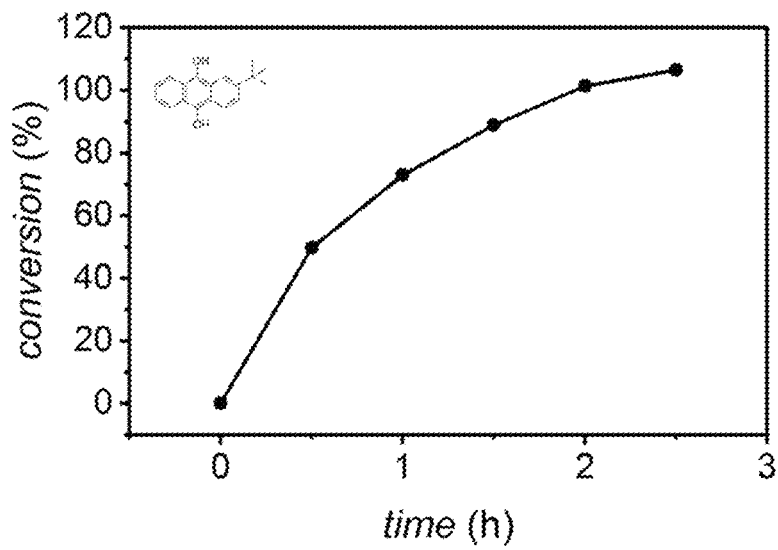
FIG. 6A is a plot of the conversion rate (%) of tert-butyl hydroanthraquinone from tert-butyl anthraquinone measured as a function of time of the experiment (h) when the reactions were operated at 60° C. for two hours.
Figure 6B:
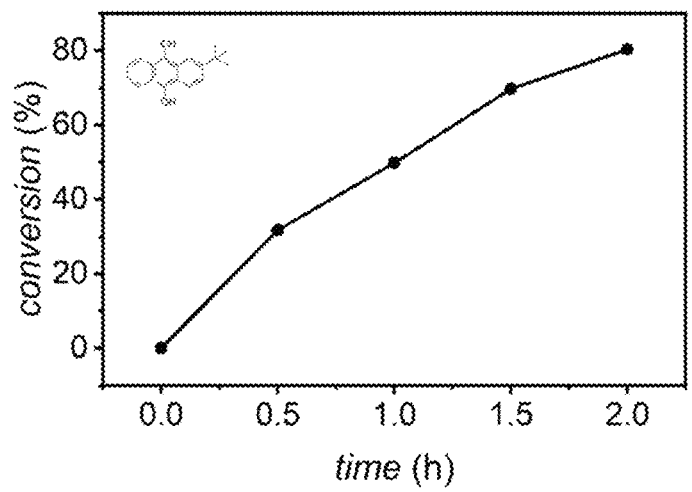
FIG. 6B is a plot of the conversion rate (%) of tert-butyl hydroanthraquinone from tert-butyl anthraquinone measured as a function of time of the experiment (h) when the reactions were operated at 40° C. for two hours.
Figure 6C:
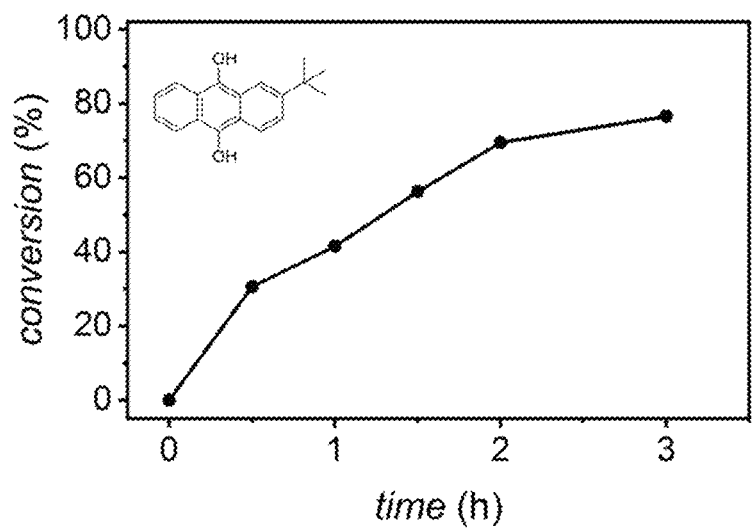
FIG. 6C is a plot of the conversion rate (%) of tert-butyl hydroanthraquinone from tert-butyl anthraquinone measured as a function of time of the experiment (h) when the reactions were operated at 50° C. for three hours.
Figure 6D:
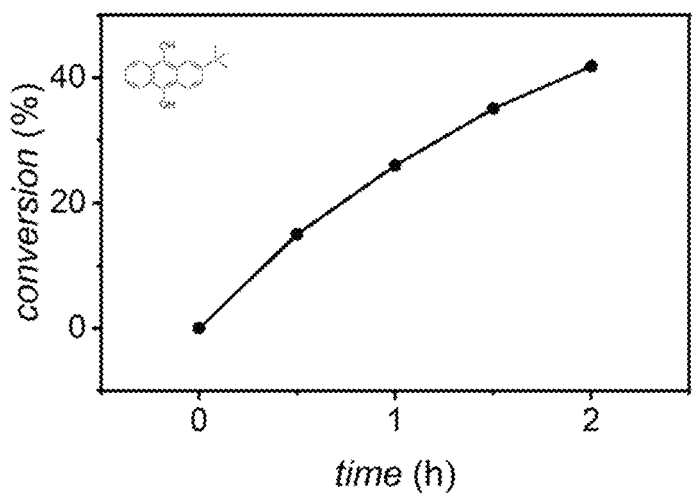
FIG. 6D is a plot of the conversion rate (%) of tert-butyl hydroanthraquinone from tert-butyl anthraquinone measured as a function of time of the experiment (h) when the reactions were operated at 25° C. for two hours.
Figure 6E:
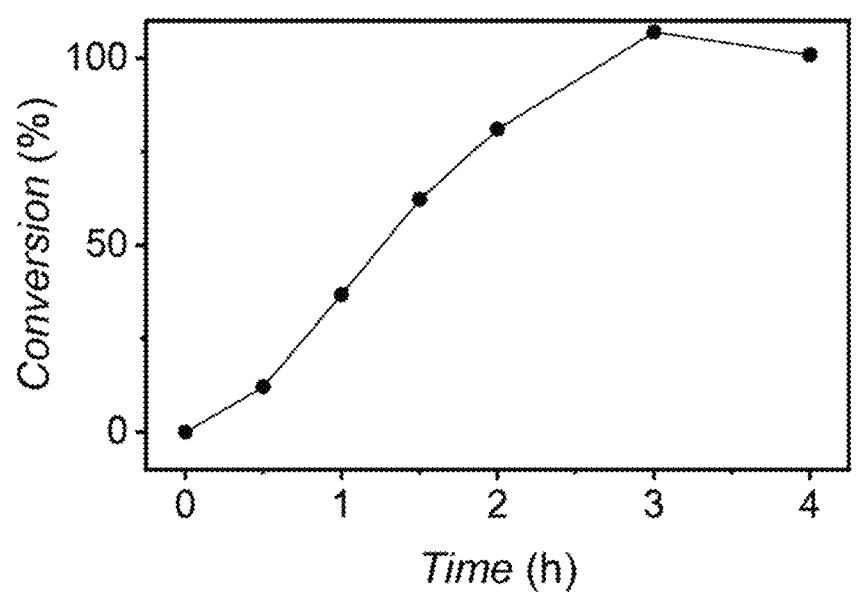
FIG. 6E is a plot of the conversion rate (%) of tert-butyl hydroanthraquinone from tert-butyl anthraquinone measured as a function of time of the experiment (h) when the reactions were operated at 60° C. for three hours.

In the example experiments which the results are shown in FIG. 6E, the electrolysis was performed in a batch reactor. In such example embodiments, chemical reaction chamber 14 is a batch-type reaction zone in which the solvent containing tert-butyl anthraquinone is initially introduced to chamber 14 and then removed together with the hydrogenated product after the reaction has occurred.

FIG. 6A shows that in example embodiments in which the electrolysis is operated at a current density of 100 mA cm$^{-2}$, 100% conversion of tert-butyl anthraquinone to tert-butyl hydroanthraquinone can be achieved at 60° C. in two hours.

FIG. 6B shows that in example embodiments in which the electrolysis is operated at a current density of 100 mA cm$^{-2}$, 80% conversion of tert-butyl anthraquinone to tert-butyl hydroanthraquinone can be achieved at 40° C. in two hours.

FIG. 6C shows that in example embodiments in which the electrolysis is operated at a current density of 100 mA cm$^{-2}$, 76% conversion of tert-butyl anthraquinone to tert-butyl hydroanthraquinone can be achieved at 50° C. in three hours.

FIG. 6D shows that in example embodiments in which the electrolysis is operated at a current density of 100 mA cm$^{-2}$, 41% conversion of tert-butyl anthraquinone to tert-butyl hydroanthraquinone can be achieved at 25° C. in two hours.

FIG. 6E shows that in example embodiments in which the electrolysis is operated at a current density of 30 mA cm$^{-2}$, 100% conversion of tert-butyl anthraquinone to tert-butyl hydroanthraquinone can be achieved at 60° C. in three hours.

Example 2—Direct Hydrogen Peroxide Synthesis

An electrochemical cell of the type illustrated in FIG. 3 was used to hydrogenate oxygen gas ($O_2$) in chemical reaction chamber 14, and to electrochemically dissociate water 56 at anode 28 which releases hydrogen ions ($H^+$) in anode chamber 20. In the example embodiment, metallic membrane 12 which separates the chemical and electrochemical reaction zones is a palladium membrane.

In these experiments, chemical reaction chamber 14 was filled with 10 mL of solvent. Anode and cathode chambers 20, 14 were filled with 3.5 mL of 1 M $H_2SO_4$ electrolyte. Water was supplied to anode chamber 20. Oxygen gas was supplied to chemical reaction chamber 14 at a rate of about 20 sccm. An applied current or electrical potential was applied between metallic membrane 12 and anode 28 (Pt mesh) for two hours. The production of hydrogen peroxide was quantified by potassium permanganate titrations (0.0002 M potassium permanganate).

Example 2.1—Proof of Concept Demonstration

In this experiment, three different types of metallic membranes 12 were tested: 1) a bare Pd membrane ("Pd"); 2) an electrodeposited Pd on Pd membrane ("Pd/Pd"); and 3) an electrodeposited Pd on Pd membrane that was annealed at 600° C. in an $N_2$ atmosphere ("a-Pd/Pd").

In this experiment, a 7:3 v/v methanol/water (70 vol % methanol) mixture was selected as solvent 354. An applied current of 50 mA was applied between metallic membrane 12 and anode 28. The production of hydrogen peroxide was confirmed by a peroxide test paper after 2 hours of electrolysis (i.e., greater than 25 mg/L hydrogen peroxide detected). The concentration of $H_2O_2$ was independently quantified by potassium permanganate titration to be 56.5 mg/L.

Example 2.2—Effect of Current and Solvents on $H_2O_2$ Synthesis Rates

Figure 7A:
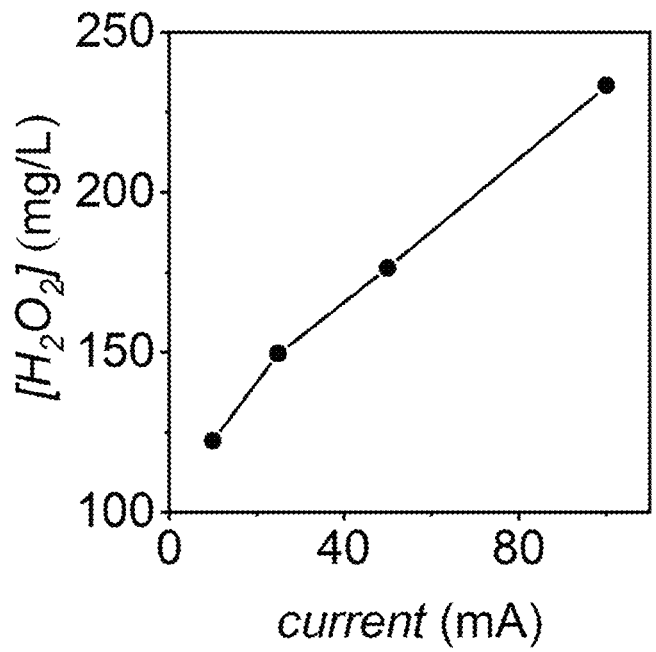
FIG. 7A is a plot of $H_2O_2$ concentration measured after 2 hours as a function of applied current.

In one experiment, applied currents of 10 mA, 25 mA, 50 mA, and 100 mA were tested. $H_2O_2$ concentration was measured after 2 hours. The results of the experiment are shown in FIG. 7A. The results showed that the $H_2O_2$ concentration increased linearly with applied current from 10 mA (122 mg/L) to 100 mA (233 mg/L).

Figure 7B:
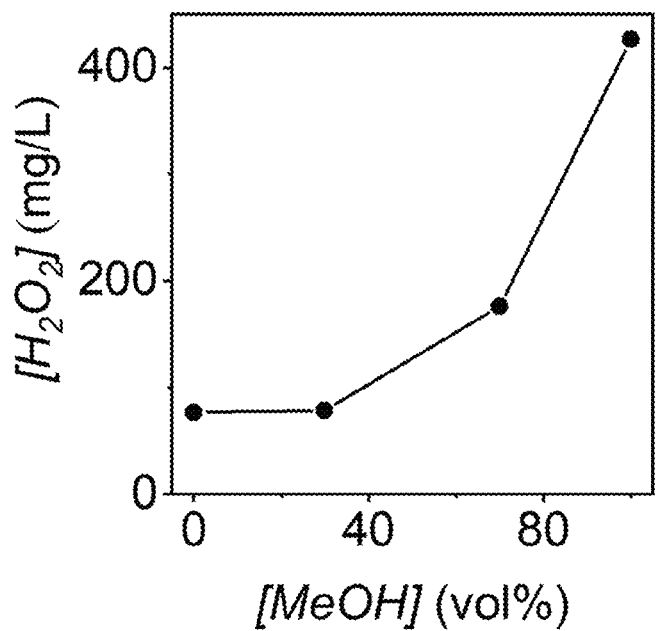
FIG. 7B is a plot of $H_2O_2$ concentration as a function of volume ratio of methanol to water used as a solvent in the hydrogenation reaction.

In another experiment, solvents containing different ratios of methanol to water were tested. The different solvents that were tested include different ratios of methanol to water. The methanol to water mixture ratios that were tested include: 0:1, 3:7, 7:3, and 1:0. The results of the experiment are shown in FIG. 7B. The results show that the production rate of $H_2O_2$ increased exponentially with increasing methanol concentration.

In another experiment, the effect of $O_2$ solubility in 70 vol % methanol was investigated by pressurizing the hydrogenation chamber. To achieve this pressurization, a reactor was designed to accommodate high oxygen pressures while keeping the oxygen flow rate constant. An oxygen pressure of 30 psi can be achieved while still maintaining the integrity of the Pd membrane. $H_2O_2$ production increased from 176 mg/L to 193 mg/L as the oxygen pressure increased from 13 psi to 23 psi. The $H_2O_2$ production rate remained constant at oxygen pressures greater than 23 psi.

Example 3.2—Effect of Catalyst Compositions on $H_2O_2$ Production Rates

Experiments were conducted to compare the effect of the composition of metallic membrane 12 and the type of solvent 354 on hydrogen peroxide production. In one experiment, the metallic membrane comprises a palladium foil without a co-catalyst ("Pd"). In another experiment, the metallic membrane comprises a palladium foil with a co-catalyst (Pd) deposited on the foil ("Pd/Pd"). In a further experiment, the metallic membrane comprises a palladium foil with a co-catalyst comprising gold (Au) and palladium (Pd) ("Au/Pd/Pd/Pd").

The Pd/Pd metallic membrane was prepared using the same methods described in Example 1.

The Au/Pd/Pd/Pd metallic membrane was prepared by co-sputtering Au and Pd onto an electrodeposited Pd/Pd membrane. Au and Pd with different ratios were co-sputtered on the Pd/Pd membrane with a thickness of 10 nm controlled by the deposition time. X-ray diffraction (XRD) experiments performed by sputtering 10 nm of each metal on glass slides (deposited under the same reaction conditions as the Pd membranes) confirmed the formation of AuPd alloys. The ratios of Au:Pd of the AuPd alloys were controlled by adjusting the sputtering power. The thickness of the film was controlled by adjusting the sputtering time. The sputtering deposition rate was calibrated by a profilometer. The compositions of the AuPd alloy films were calculated using X-ray fluorescence (XRF) to calibrate the equivalent thickness of the single metal components.

Three different atomic ratios AuPd ($Au_1Pd$, $Au_5Pd$, and $Au_{12}Pd$) were chosen to examine the effect of metal composition on $H_2O_2$ production rates. For each experiment, AuPd/Pd/Pd was placed between the electrochemical and hydrogenation chambers, 10 mL 70 v/v % methanol/water was used as the solvent, and a current of 50 mA was applied between anode 328 and metallic membrane 12. The concentration of $H_2O_2$ was measured after 2 hours. The results are shown in Table 2 below.

TABLE 2

| Metallic membrane | Solvent | $H_2O_2$ concentration (mg/L) |
|---|---|---|
| Pd | methanol | 427 |
| Pd | 70 vol % methanol | 176 |
| Pd/Pd | methanol | 179 |
| Pd/Pd | 70 vol % methanol | 57.5 |
| $Au_1Pd/Pd/Pd$ | 70 vol % methanol | 286 |
| $Au_3Pd/Pd/Pd$ | 70 vol % methanol | 422 |
| $Au_{12}Pd/Pd/Pd$ | 70 vol % methanol | 443 |

In summary, one aspect of the invention relates to a multi-chamber electrochemical cell for chemical reactions, said cell comprising:

a chemical reaction chamber;

an electrochemical reaction chamber;

an anode exposed in said electrochemical reaction chamber;

a metallic membrane comprising a co-catalyst between said chemical reaction chamber and said electrochemical reaction chamber, wherein said co-catalyst may be exposed in said chemical reaction chamber, and wherein said metallic membrane may be adapted to electrochemically reduce a hydrogen ion to a hydrogen atom and to allow said hydrogen atom to diffuse through said membrane.

wherein said metallic membrane comprising a co-catalyst may be a dense metallic membrane. The membrane may comprise palladium (Pd), or other transition metals.

wherein said hydrogen permeable membrane may be laminated to an ion exchange membrane.

wherein said hydrogen permeable membrane may be laminated to a metallic mesh.

wherein optionally, an ion exchange membrane may separate said anode from said M/Pd cathode. For example, wherein said ion exchange membrane may be a Nafion membrane.

Wherein optionally, said chemical reaction chamber may be separated into a multitude of small reservoirs, wherein said reservoirs may be connected to a flow field.

Wherein said chemical reactions, for example, may comprise hydrogenations, dehydrogenations, and hydrodeoxygenations.

Wherein said multi-chamber electrochemical cell may be an electrocatalytic palladium membrane reactor (ePMR) or an electrocatalytic palladium membrane flow cell (ePMR flow).

Another aspect of the invention provides a method of preparing a hydrogen permeable membrane comprising a co-catalyst, said method comprising sputter-depositing a co-catalyst onto a hydrogen permeable membrane.

In some embodiments, the method of preparing a hydrogen permeable membrane comprising a co-catalyst comprises the steps of:

(i) Rolling palladium foils to a thickness in the range from 150 μm to 25 μm;

(ii) Electro-depositing a palladium salt onto said palladium foil from step (i);

(iii) Sputter-depositing a co-catalyst onto a product from step (ii);

(iv) Optionally, washing and/or drying a produced co-catalyst sputtered palladium membrane from step (iii).

Wherein said palladium salt in step (ii) may be palladium chloride ($PdCl_2$).

Wherein said sputter-deposition in step (iii) may be performed in an inert atmosphere, for example, under argon.

Wherein said co-catalyst may comprise at least one transition metal.

Wherein said co-catalyst may comprise one or more transition metals selected from gold, iridium, palladium, platinum, or ruthenium.

Wherein a voltage for said sputter-depositing process in step (iii) may be adjusted based on said co-catalyst to be deposited. For example, wherein said voltage may be about 30 mA for gold, 30 mA for platinum, and 70 mA for iridium with a sputter-deposition rate of 0.2 mm/s Wherein said produced co-catalyst sputtered palladium membrane may be used in a variety of chemical reactions, such as, for example, hydrogenations, dehydrogenations, and hydrodeoxygenations.

Wherein said produced co-catalyst sputtered palladium membrane from step (iii) may be used in a palladium membrane reactor.

Another aspect of the invention provides a method for performing coupled chemical and electrochemical reactions said method comprising:

applying a current and/or electrical potential between an anode and a metallic membrane comprising a co-catalyst, wherein said metallic membrane comprising said co-catalyst may be selective to hydrogen;

oxidizing at said anode a first reactant to form one or more oxidized products and one or more hydrogen ions in an electrochemical reaction chamber;

optionally, transporting said hydrogen ions through an ion exchange membrane to said metallic membrane comprising said co-catalyst;

reducing said hydrogen ions to form hydrogen atoms at said metallic membrane;

diffusing said hydrogen atoms through said metallic membrane into a chemical reaction chamber; and reacting said hydrogen atoms with a second reactant in said chemical reaction chamber, wherein the reaction may be supported by said co-catalyst and optionally a solvent.

Wherein said current and/or electrical potential may be in the range from 10 $A/cm^2$ to 400 $A/cm^2$.

Wherein said current and/or electrical potential may be in the range from 150 $A/cm^2$ to 250 $A/cm^2$.

Wherein said metallic membrane may be a palladium membrane comprising a co-catalyst.

Wherein said co-catalyst may be selected from one or more transition metals depending on said second reactant and a desired reaction in said chemical reaction chamber.

Wherein said solvent may be selected from one or more chemical solvents (including; alcohols, chlorinated molecules, hydrocarbons, ketones, or water).

Wherein the solvent in the electrochemical chamber is water, with an added electrolyte salt that adjusts the pH between 1 and 14.

Wherein in one example the reactant in the chemical chamber is oxygen gas, which reacts with hydrogen permeating through the hydrogen-selective membrane to form hydrogen peroxide.

Wherein in a second example, the reactant in the chemical chamber is a quinone, which reacts with hydrogen permeating through the hydrogen-selective membrane to form a hydroquinone.

The following documents describe related technologies. Embodiments of the present technology may incorporate features as described in these references. All of the following references are hereby incorporated herein by reference as if fully set forth herein for all purposes.

1. Berlinguette, C P; Sherbo, R S: Methods and apparatus for performing chemical and electrochemical reactions, WO 2019/144,239.
2. Delima, R S et al.: Supported palladium membrane reactor architecture for electrocatalytic hydrogenation. J Mat Chem A: Mat Energy Sustain 2019 (7) 26586.
3. Sherbo, R S et al.: Efficient electrocatalytic hydrogenation with a palladium membrane reactor. J Am Chem Soc 2019 (141,19) 7815.
4. Sherbo, R S et al.: Complete electron economy by pairing electrolysis with hydrogenation. Nature Cat 2018 (1) 502.
5. Jansonius, R. P.; Kurimoto, A.; Marelli, A. M.; Huang, A.; Sherbo, R. S.; Berlinguette, C. P. Hydrogenation without $H_2$ Using a Palladium Membrane Flow Cell. Cell Reports Physical Science 2020, 1 (7), 100105.
6. Huang, A.; Cao, Y.; Delima, R. S.; Ji, T.; Jansonius, R. P.; Johnson, N. J. J.; Hunt, C.; He, J.; Kurimoto, A.; Zhang, Z.; Berlinguette, C. P. Electrolysis Can Be Used to Resolve Hydrogenation Pathways at Palladium Surfaces in a Membrane Reactor. JACS Au 2021, 1 (3), 336-343.
7. Kurimoto, A.; Jansonius, R. P.; Huang, A.; Marelli, A. M.; Dvorak, D. J.; Hunt, C.; Berlinguette, C. P. Physical Separation of H2 Activation from Hydrogenation Chemistry Reveals the Specific Role of Secondary Metal Catalysts. Angew. Chem. Int. Ed Engl. 2021, 60 (21), 11937-11942.
8. Edwards, J. K.; Hutchings, G. J. Palladium and Gold-Palladium Catalysts for the Direct Synthesis of Hydrogen Peroxide. Angew. Chem. Int. Ed Engl. 2008, 47 (48), 9192-9198.
9. Chinta, S.; Lunsford, J. H. A Mechanistic Study of H2O2 and H2O Formation from H2 and O2 Catalyzed by Palladium in an Aqueous Medium. J. Catal. 2004, 225 (1), 249-255.
10. Edwards, J. K.; Solsona, B.; E., N. N.; Carley, A. F.; Herzing, A. A.; Kiely, C. J.; Hutchings, G. J. Switching Off Hydrogen Peroxide Hydrogenation in the Direct Synthesis Process. Science. 2009, 323(5917), 1037-1041.
11. Murray, A. T.; Voskian, S.; Schreier, M.; Alan Hatton, T.; Surendranath, Y. Electrosynthesis of Hydrogen Peroxide by Phase-Transfer Catalysis. Joule. 2019, 3(12), 2942-2954. Peroxide by Phase-Transfer Catalysis. Joule. 2019, 3(12), 2942-2954.

Interpretation of Terms

Unless the context clearly requires otherwise, throughout the description and the claims:
  "comprise", "comprising", and the like are to be construed in an inclusive sense, as opposed to an exclusive or exhaustive sense; that is to say, in the sense of "including, but not limited to";
  "connected", "coupled", or any variant thereof, means any connection or coupling, either direct or indirect, between two or more elements; the coupling or connection between the elements can be physical, logical, or a combination thereof;
  "herein", "above", "below", and words of similar import, when used to describe this specification, shall refer to this specification as a whole, and not to any particular portions of this specification;
  "or", in reference to a list of two or more items, covers all of the following interpretations of the word: any of the items in the list, all of the items in the list, and any combination of the items in the list;
  the singular forms "a", "an", and "the" also include the meaning of any appropriate plural forms. These terms ("a", "an", and "the") mean one or more unless stated otherwise;
  "and/or" is used to indicate one or both stated cases may occur, for example A and/or B includes both (A and B) and (A or B);
  "approximately" when applied to a numerical value means the numerical value±10%;
  where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and
  "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:
  in some embodiments the numerical value is 10;
  in some embodiments the numerical value is in the range of 9.5 to 10.5;
and if from the context the person of ordinary skill in the art would understand that values within a certain range are substantially equivalent to 10 because the values with the range would be understood to provide substantially the same result as the value 10 then "about 10" also includes:

in some embodiments the numerical value is in the range of C to D where C and D are respectively lower and upper endpoints of the range that encompasses all of those values that provide a substantial equivalent to the value 10.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for producing hydrogen peroxide by performing coupled chemical and electrochemical reactions, the method comprising:

applying an electrical potential between an anode and a metallic membrane;

electrochemically dissociating, at the anode, a hydrogen-containing compound to form hydrogen ions;

transporting the hydrogen ions through an ion exchange membrane to the metallic membrane;

at the metallic membrane, reducing the hydrogen ions to form hydrogen atoms;

diffusing the hydrogen atoms through the metallic membrane into a chemical reaction chamber; and reacting the hydrogen atoms with a reactant on a surface of the metallic membrane in the chemical reaction chamber to form a first product, wherein the reactant comprises shuttle molecules or a mixture comprising gaseous oxygen and a solvent.

2. The method according to claim 1, wherein the reactant comprises shuttle molecules, and the first product comprises hydrogenated shuttle molecules.

3. The method according to claim 2, further comprising:

removing the hydrogenated shuttle molecules from the chemical reaction chamber; and reacting the hydrogenated shuttle molecules with an oxygen-containing gas to form a second product comprising hydrogen peroxide.

4. The method according to claim 3, wherein the shuttle molecule is a quinone compound or a quinone derivative.

5. The method according to claim 4, wherein the hydrogen-containing compound is water.

6. The method according to claim 5, wherein the hydrogen-containing compound is free of hydrogen gas ($H_2$).

7. The method according to claim 5, wherein reacting the hydrogen atoms with the shuttle molecule is performed in an organic solvent or a mixture of organic solvents.

8. The method according to claim 7, further comprising flowing a supply of shuttle molecules or shuttle molecules contained in the solvent into the chemical reaction chamber, wherein a concentration of the shuttle molecule in the solvent flowing into the chemical reaction chamber is in the range of from 0.1 M to 1 M.

9. The method according to claim 3, wherein reacting the oxygen-containing gas with the hydrogenated shuttle molecules forms the second product comprising hydrogen peroxide and regenerated shuttle molecules.

10. The method according to claim 9, further comprising returning impurities in the second product containing the regenerated shuttle molecule to the chemical reaction chamber.

11. The method according to claim 1, wherein the reactant comprises the mixture comprising gaseous oxygen and a solvent, and the first product comprises hydrogen peroxide.

12. The method according to claim 11, further comprising supplying a constant flow of the mixture comprising gaseous oxygen and the solvent to the chemical reaction chamber.

13. The method according to claim 12, wherein the solvent comprises an organic solvent, an aqueous solvent, or a mixture comprising an organic solvent and an aqueous solvent.

14. The method according to claim 13, wherein the solvent comprises alcohol.

15. The method according to claim 11, further comprising maintaining an above-ambient pressure within the chemical reaction chamber, and wherein maintaining the above-ambient pressure comprises maintaining a pressure of the gaseous oxygen within the chemical reaction chamber in the range of from 5 psi to 30 psi.

16. The method according to claim 11, further comprising oxidizing, at the anode, a carbon-containing compound using the hydrogen peroxide formed at the chemical reaction chamber to form one or more useful products.

17. The method according to claim 1, wherein the metallic membrane comprises a dense metallic hydrogen selective layer, and wherein the hydrogen selective layer comprises a layer of palladium or a palladium alloy.

18. The method according to claim 17, wherein reacting the hydrogen atoms with the reactant comprises a catalyzed reaction catalyzed by a co-catalyst on the hydrogen selective layer.

19. The method according to claim 18, wherein the co-catalyst comprises one or more transition metals.

20. The method according to claim 19, wherein the co-catalyst comprises palladium (Pd) and gold (Au).

\* \* \* \* \*